(12) United States Patent
Saimi et al.

(10) Patent No.: US 7,080,350 B2
(45) Date of Patent: Jul. 18, 2006

(54) METHOD FOR DEVELOPING WEB APPLICATIONS, DEVELOPMENT SUPPORT SYSTEM AND STORAGE MEDIUM FOR STORING PROGRAMS DEVELOPED ACCORDING TO THE METHOD

(75) Inventors: Akihiro Saimi, Tokyo (JP); Tsutomu Syomura, Tokyo (JP); Hiroshi Suganuma, Tokyo (JP); Hidetoshi Nanbu, Tokyo (JP)

(73) Assignee: Hitachi Software Engineering Co., Ltd., Kanagawa (JP)

( * ) Notice: Subject to any disclaimer, the term of this patent is extended or adjusted under 35 U.S.C. 154(b) by 825 days.

(21) Appl. No.: 09/793,601

(22) Filed: Feb. 27, 2001

(65) Prior Publication Data

US 2001/0047402 A1 Nov. 29, 2001

(30) Foreign Application Priority Data

Mar. 31, 2000 (JP) ............................. 2000/097395
Jan. 15, 2001 (JP) ............................. 2001/006006

(51) Int. Cl.
G06F 9/44 (2006.01)
G06G 15/00 (2006.01)
(52) U.S. Cl. .................. 717/100; 717/106; 717/109; 715/513; 715/526
(58) Field of Classification Search ................ 717/130, 717/101–106, 107, 108, 110, 116, 118; 709/215, 709/203; 345/731; 719/311; 715/513, 526, 715/514; 707/1
See application file for complete search history.

(56) References Cited

U.S. PATENT DOCUMENTS 5,768,510 A     6/1998  Gish
5,850,511 A  * 12/1998  Stoecker et al. ............... 714/38
6,011,916 A  *  1/2000  Moore et al. ................ 717/104
6,038,590 A  *  3/2000  Gish ........................... 709/203
6,115,739 A  *  9/2000  Ogawa et al. ............... 709/215
6,327,628 B1 * 12/2001  Anuff et al. ................. 719/311
6,442,748 B1 *  8/2002  Bowman-Amuah ......... 717/108
6,536,037 B1 *  3/2003  Barrese et al. .............. 717/151
6,584,548 B1 *  6/2003  Bourne et al. .............. 711/134
6,601,233 B1 *  7/2003  Underwood ................ 717/102
6,633,311 B1 * 10/2003  Douvikas et al. ........... 345/731
6,654,949 B1 * 11/2003  Fraenkel et al. ............ 717/130

(Continued)

FOREIGN PATENT DOCUMENTS

WO         99/50771        7/1999

OTHER PUBLICATIONS

Suganuma et al., "Concurrent development on a framework and its applicatio", In Proc. COMPSAC, pp. 16-21, 1998.*

(Continued)

Primary Examiner—Ohameli C. Das
(74) Attorney, Agent, or Firm—Mattingly, Stanger, Malur & Brundidge, P.C.

(57) ABSTRACT

In the development of a Web application system, each of the components of the servlet, JSP, and Bean is define in a one-to-one relationship corresponding to each screen image, thereby making the relationship among each of the components clear. A component table generating unit is provided for generating the definition of each component as a component table from screen design. Also provided is an automatic code generating unit for automatically generating the code of servlet, JSP, and Bean using the component table and the information of the design document. This facilitates the development and alleviates the burden on developers or programmers.

18 Claims, 42 Drawing Sheets

U.S. PATENT DOCUMENTS

| | | | |
|---|---|---|---|
| 6,721,713 B1* | 4/2004 | Guheen et al. | 705/1 |
| 6,721,747 B1* | 4/2004 | Lipkin | 707/10 |
| 6,769,095 B1* | 7/2004 | Brassard et al. | 715/513 |
| 6,785,667 B1* | 8/2004 | Orbanes et al. | 707/1 |
| 6,850,893 B1* | 2/2005 | Lipkin et al. | 705/8 |
| 6,854,120 B1* | 2/2005 | Lo et al. | 719/311 |
| 6,877,111 B1* | 4/2005 | Sharma et al. | 714/13 |
| 6,880,126 B1* | 4/2005 | Bahrs et al. | 715/526 |
| 6,889,359 B1* | 5/2005 | Conner et al. | 715/509 |
| 6,957,186 B1* | 10/2005 | Guheen et al. | 705/1 |

OTHER PUBLICATIONS

Onoma et al., "Management of object oriented development based on ranked use cases", In Proc. COMPSAC, pp. 246-251, 1997.*

Kochikar, "The object-powered Web", IEEE Software, 15(3):57-62, May 1998.*

Meyer, "The role of object-oriented metrics", IEEE Computer, 31(11):123-127, Nov. 1998.*

Title: Database on the Web: Technologies for federation Architectures and Case studies, author: Ralf Kramer, 1997, ACM.*

Title: cogentHelp: A Tool for authoring dynamically generated help for Java GUIS, author: Caldwell et al, IEEE, 1997.*

E. Stroulia, "Reverse Engineering Legacy Interfaces: An Interaction-Driven Appoach", 1999, IEEE, pp. 292-302.

A. Saimi, "Presentation Layer Framework of Web Application Systems With Server-Side Java Technology", 2000, IEEE, pp. 473-478.

Li Chunlin, "A Java-Based Method for Developing Web Application System", 1999, pp. 1079-1082.

G. Seshadri, Internet Web Publication, JavaWorld, Understanding JavaServer Pages Model 2 Architecture: Exploring the MVC Design Pattern, Dec., 1999.

"Commerce Servers Labs Test", Informationweek, vol., 3, No. 3, Apr. 29, 1997.

* cited by examiner

Fig.2 System Configuration

Fig.4 Flowchart for generating a component table

Fig.5 Flowchart for automatically generating a source code

GENERATION OF SERVLET SOURCE CODE

Fig.8 Source code of servlet superclass

```
                                                                    801
package <Package name of the servlet>;
import <Necessary package>;
                            802
abstract public class <BaseServlet> extends HttpServlet {

String jspPage;              // JSP page name
    String beanName;             // Bean class name
    String errorJspPage;         // Error JSP page name
803 <BaseBean> bean;             // Bean object to be used void business (HttpServletRequest req, HttpServletResponse resp)
    throws ServletException, IOException {
804    bean = (<BaseBean>)Beans.instantiate(this.getClass().getClassLoader(), getBeanName());
    } void attribute (HttpServletRequest req, HttpServletResponse resp)
    throws ServletException, IOException {
805    req.setAttribute("bean", bean);
    } void forward (HttpServletRequest req, HttpServletResponse resp)
    throws ServletException, IOException {
806    RequestDispatcher rd = getServletContext().getRequestDispatcher(getJspPage());
       rd.forward(req, resp);
    } public void init () throws ServletException {
       names ();
807 }                          808
    abstract void names ();

public void doPost (HttpServletRequest req, HttpServletResponse resp)
    throws ServletException, IOException {
809    try {
          business(req,resp);        // Business transaction
          attribute(req,resp);       // Bean setting
          forward(req,resp);         // JSP call
       } catch (ServletException e) {
          error (req,resp,e.getMessage());
       }
    } void error (HttpServletRequest req, HttpServletResponse resp , String message)
    throws ServletException, IOException {
810    setJspPage(getErrorJspPage());
       req.setAttribute("message", message);
       forward();
    } void setJspPage (String page) { this.jspPage = page; }
    String getJspPage () { return jspPage; }
811 void setBeanName(String name) { this.beanName = name; }
    String getBeanName() { return beanName; }
    void setErrorJspPage (String page) { this. errorJspPage = page; }
    String getErrorJspPage () { return errorJspPage; }
}
```

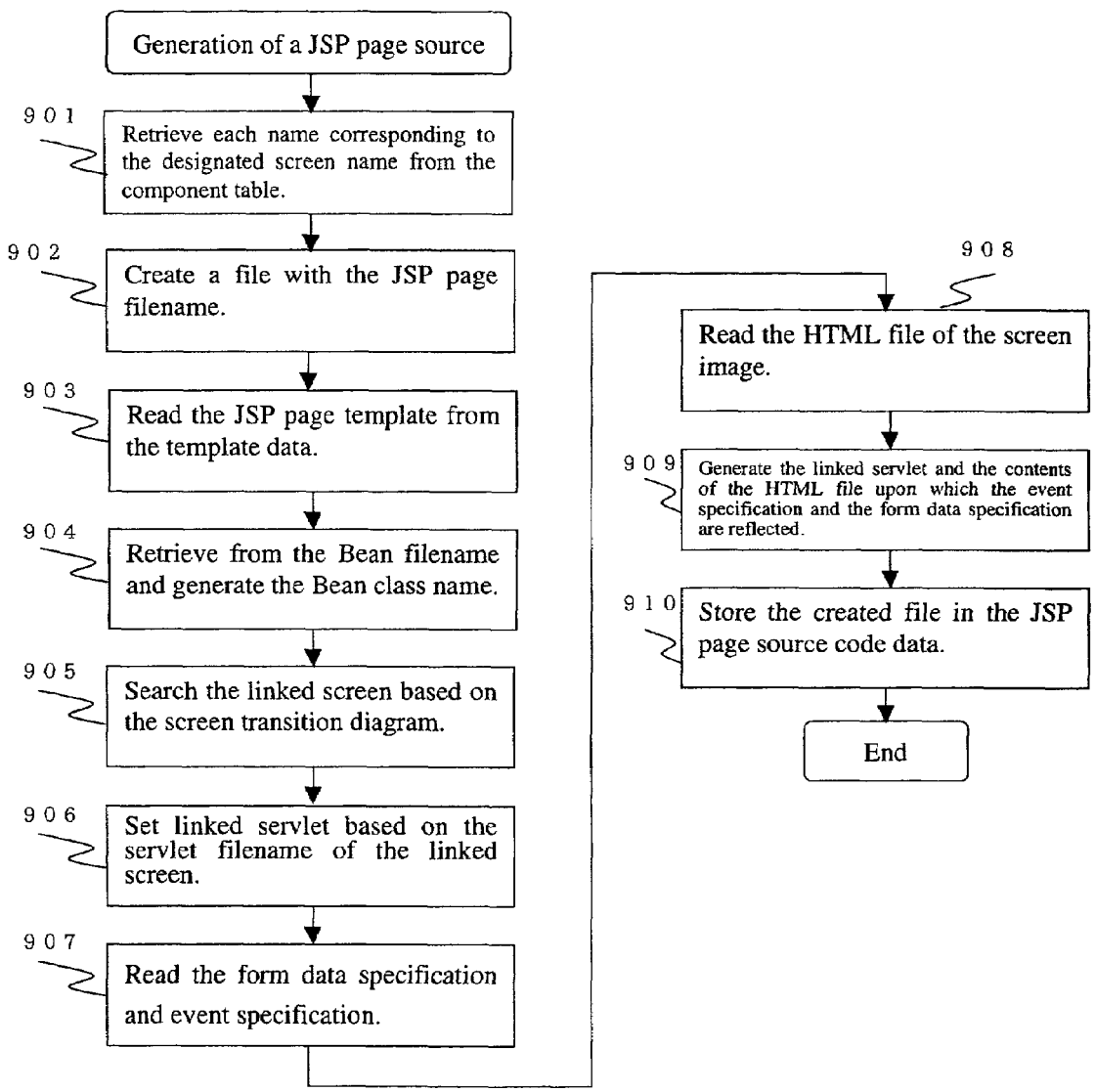
Fig.9 Flowchart for automatically generating a JSP page source code

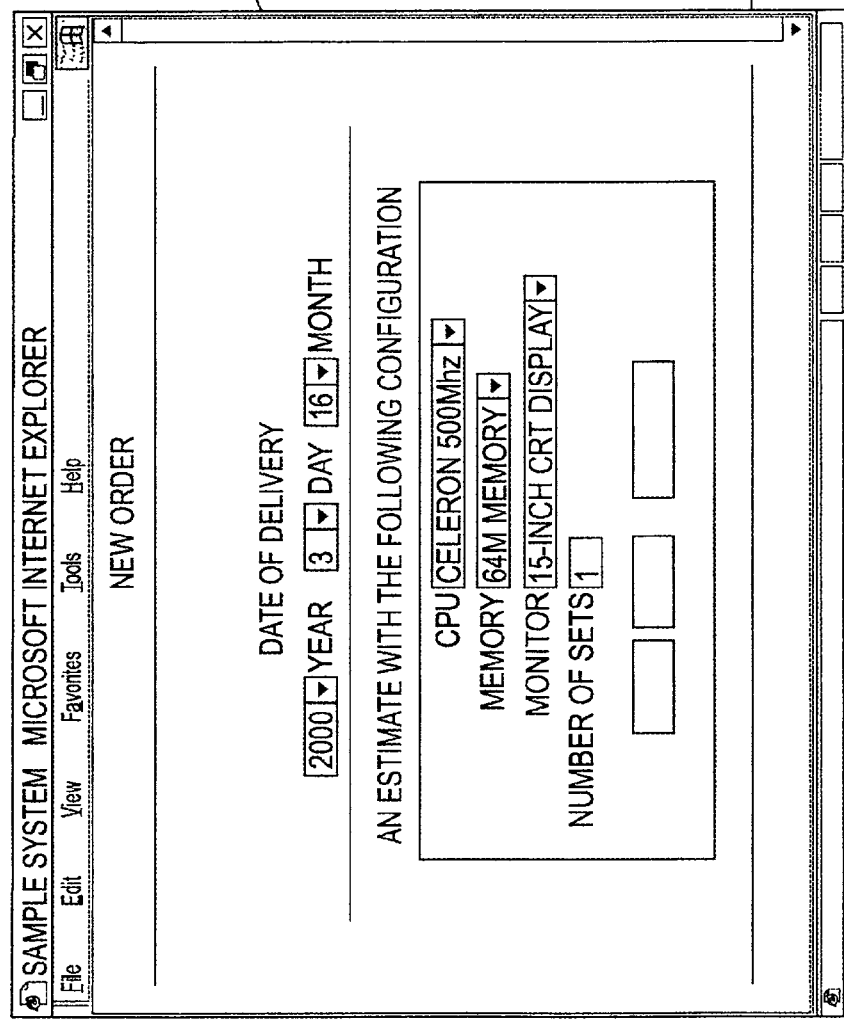

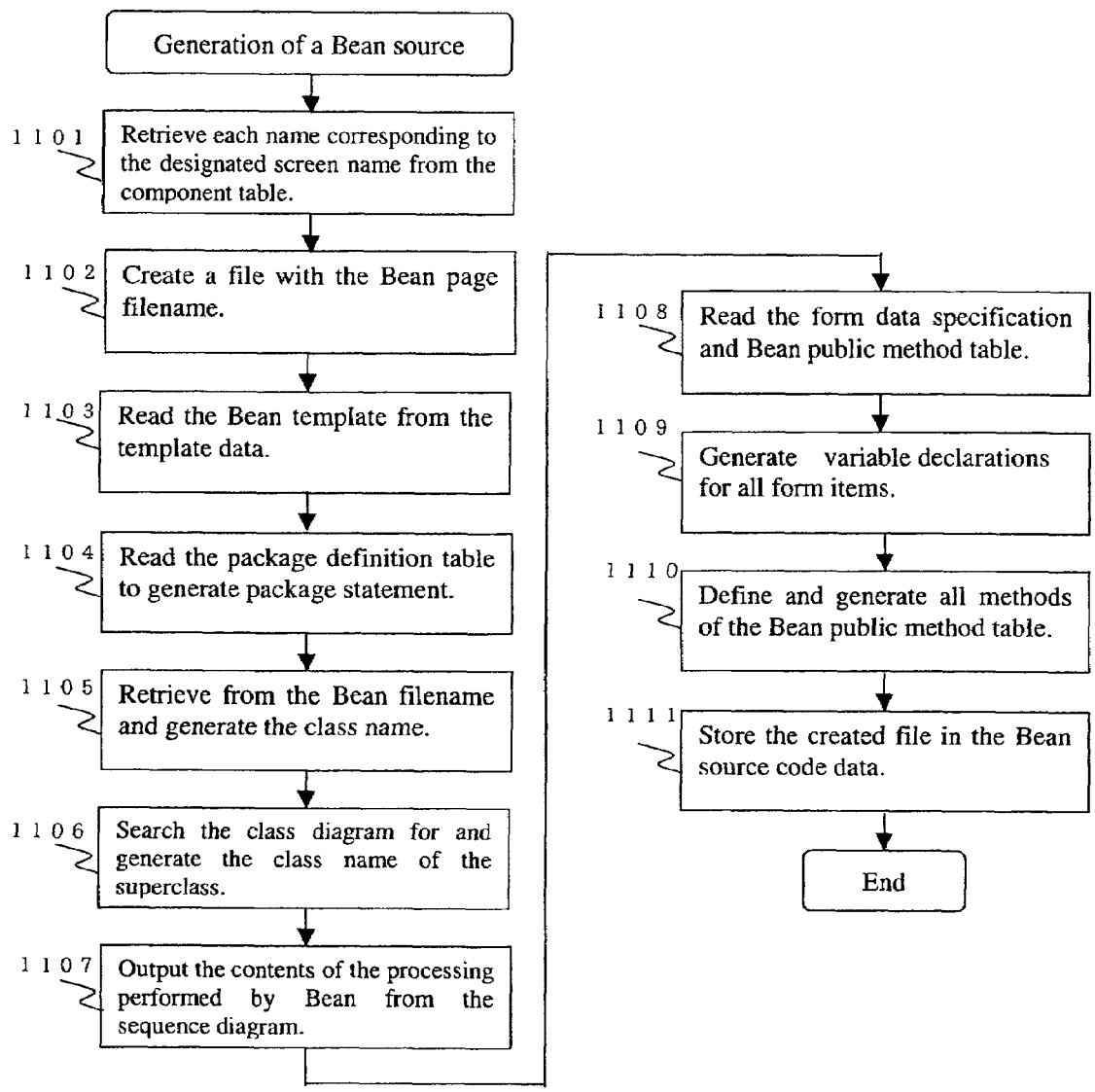
Fig.11 Flowchart for automatically generating a Bean source code

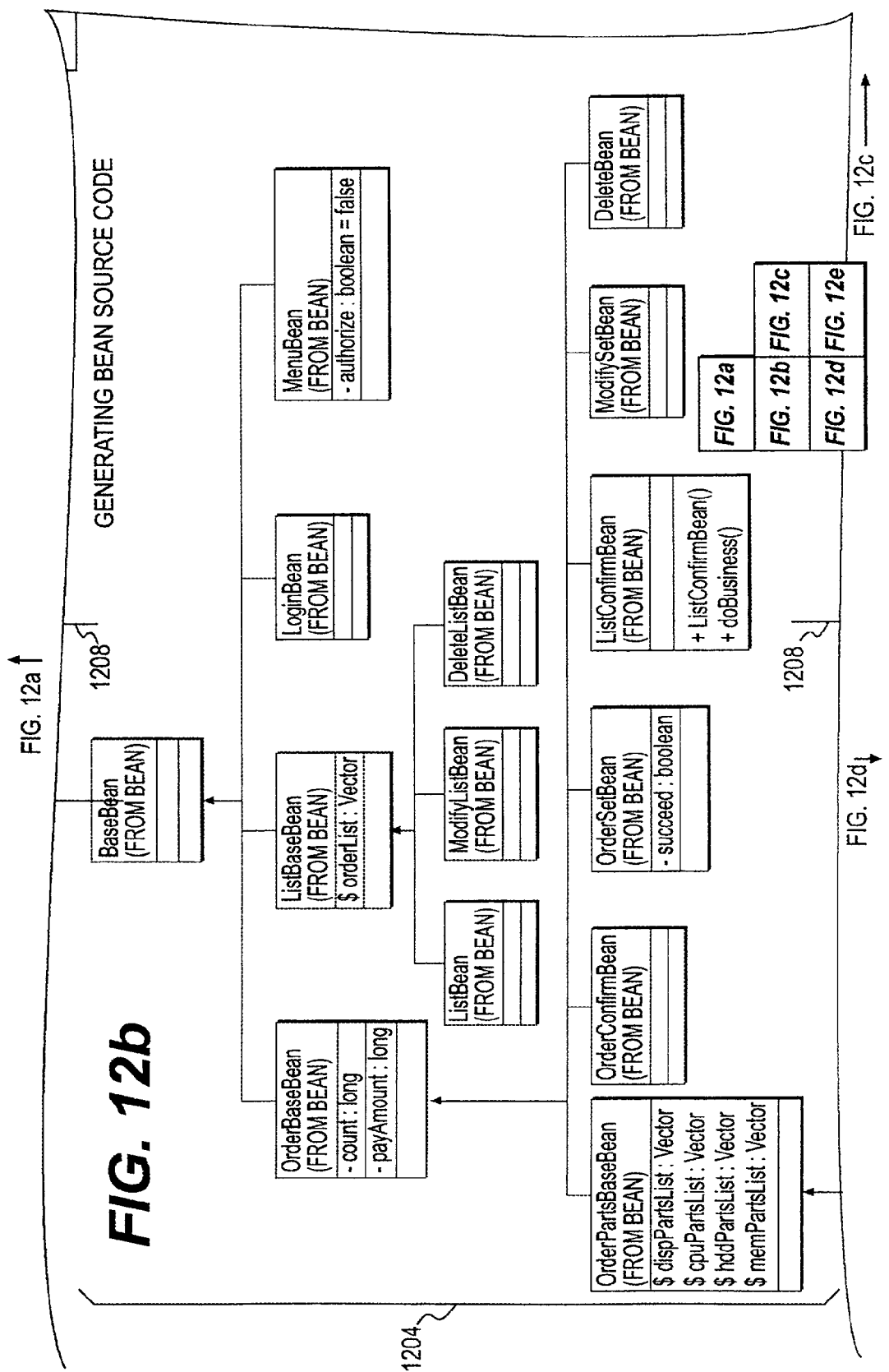

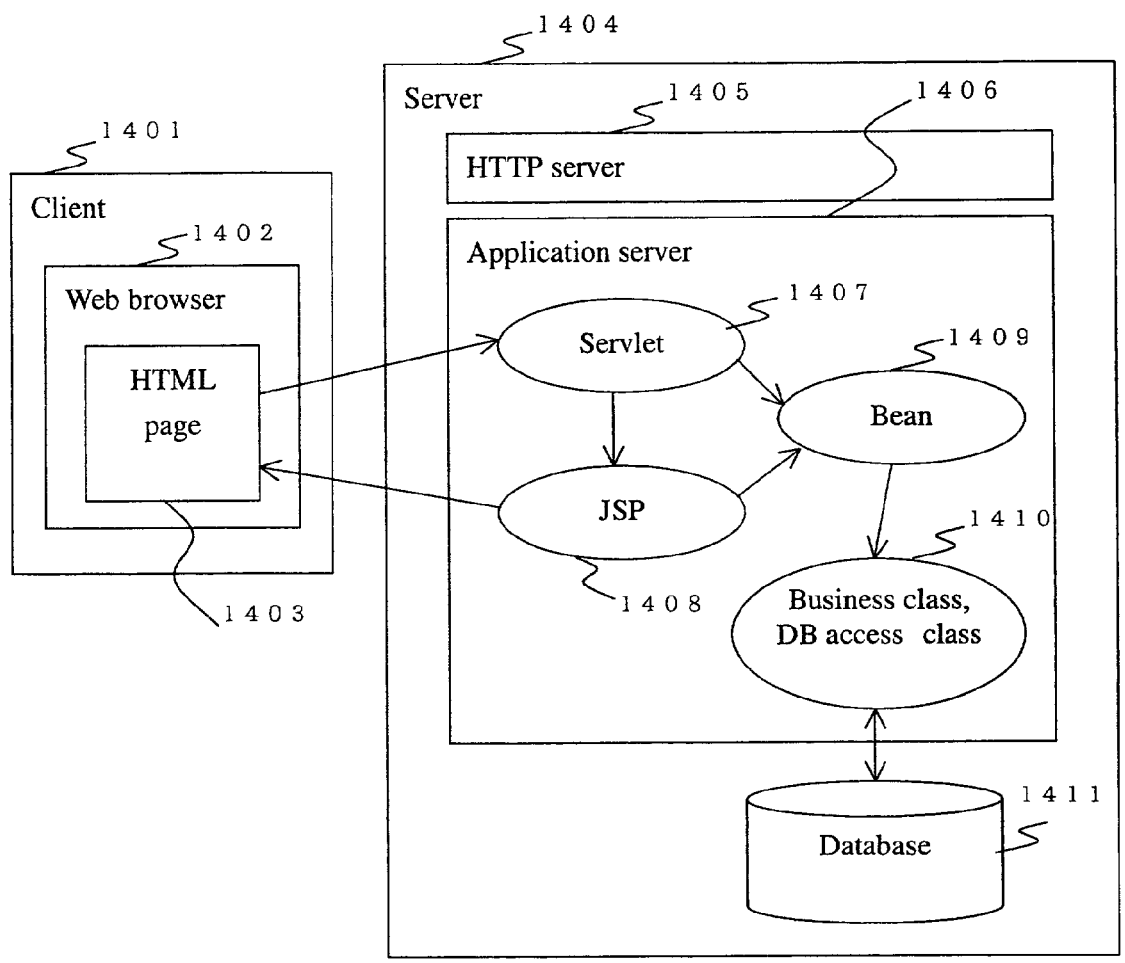
Fig.14 Overall configuration of a Web application system employing Servlet, JSP, and Bean Fig. 15 Relationship between recipient and response components

| Input screen | Recipient component | | Response component | | Output screen |
|---|---|---|---|---|---|
| Screen A | Recipient/response component 1 | | | | Screen B |
| Screen B | Recipient window parts 1 | Recipient part 1 | Response part 1 | | Screen C |
| Screen C | | Recipient part 2 | Response part 2 | | Screen D |
| Screen D | | Recipient part 3 | | | Screen E |
| Screen E | | Recipient part 4 | Response window parts 1 | Response part 3 | Screen F |
| Screen F | | Recipient part 5 | | Response part 4 | Screen G |
| Screen G | Recipient window parts 2 | Recipient part 6 | Response part 5 | | Screen H |
| Screen H | | | Response part 6 | | Screen I |
| Screen I | | Recipient/response part 2 | | | Screen J |
| Screen J | Recipient part 7 | | Response part 7 | | Screen K |
| Screen K | Request part 8 | | Response window parts 2 | Response part 8 | Screen L |
| Screen L | Request part 9 | | | Response part 9 | Screen M |

Fig. 16 Definition 1 of recipient and response components

| Input screen | Event | Recipient component | Condition | Response component | Output screen |
|---|---|---|---|---|---|
| 1 5 0 1 | 1 6 0 1 | 1 5 0 2 | 1 6 0 2 | 1 5 0 3 | 1 5 0 4 |
| Screen A | [OK] Depressed | Servlet B | None | JSP B | Screen B |
| Screen B | [OK] Depressed | Servlet C | If OK | JSP C | Screen C |
|  |  |  | If NG | JSP D | Screen D |
| Screen C (1 6 0 3) | [OK] Depressed | Servlet E | None | JSP E | Screen E |
|  | [NG] Depressed | Servlet A | None | JSP A | Screen A |
| Screen D | [OK] Depressed | Servlet A | None | JSP A | Screen A |

Fig. 17 Definition 2 of recipient and response components

| Input screen | Recipient component | Event | Condition | Response component | Output screen |
|---|---|---|---|---|---|
| 1 5 0 1 | 1 5 0 2 | 1 6 0 1 | 1 6 0 2 | 1 5 0 3 | 1 5 0 4 |
| Screen A | Servlet A | [OK] Depressed | None | JSP B | Screen B |
| Screen B | Servlet B | [OK] Depressed | If OK | JSP C | Screen C |
|  |  |  | If NG | JSP D | Screen D |
| Screen C (1 7 0 1) | Servlet C | [OK] Depressed | None | JSP E | Screen E |
|  |  | [NG] Depressed | None | JSP A | Screen A |
| Screen D | Servlet D | [OK] Depressed | None | JSP A | Screen A |

Fig.18 Component definition table

| Screen name | Screen ID | Servlet name | Bean name | JSP name |
|---|---|---|---|---|
| Top | default | DefaultServlet | DefaultBean | default.jsp |
| Menu | menu | MenuServlet | MenuBean | menu.jsp |
| New order | order | OrderServlet | OrderBean | order.jsp |
| New order insufficient input | orderError | | | orderError.jsp |
| Order confirm | confirm | ConfirmServlet | ConfirmBean ItemBean PriceBean | confirm.jsp |
| Order completed | complete | CompleteServlet | CompleteBean | complete.jsp |
| Existing order list | list | ListServlet | ListBean | list.jsp |
| Existing order contents confirm | detail | DetailServlet | DetailBean AmountBean | detail.jsp |
| Order change | modify | ModifyServlet | ModifyBean ItemBean | modify.jsp |
| Order cancel | remove | RemoveServlet | RemoveBean | remove.jsp |
| Log-in | login | LoginServlet | LoginBean | login.jsp |
| Log-in error | loginError | | | loginError.jsp |
| Error display | error | — | — | error.jsp |

Fig.19 Component definition table

| Screen name | Screen ID | Servlet name | Bean name | JSP name |
|---|---|---|---|---|
| Top | default | DefaultServlet | DefaultBean | default.jsp |
| Menu | menu | MenuServlet | MenuBean | menu.jsp |
| New order | order | OrderServlet | OrderBean | order.jsp |
| New order insufficient input | orderError | — | — | orderError.jsp |
| Order confirm | confirm | ConfirmServlet | ConfirmBean | confirm.jsp |
| Order completed | complete | CompleteServlet | CompleteBean | complete.jsp |
| Existing order list | list | ListServlet | ListBean | list.jsp |
| Existing order contents confirm | detail | DetailServlet | DetailBean | detail.jsp |
| Order change | modify | ModifyServlet | ModifyBean | modify.jsp |
| Order cancel | remove | RemoveServlet | RemoveBean | remove.jsp |
| Log-in | login | LoginServlet | LoginBean | login.jsp |
| Log-in error | loginError | — | — | loginError.jsp |
| Error display | error | — | — | error.jsp |

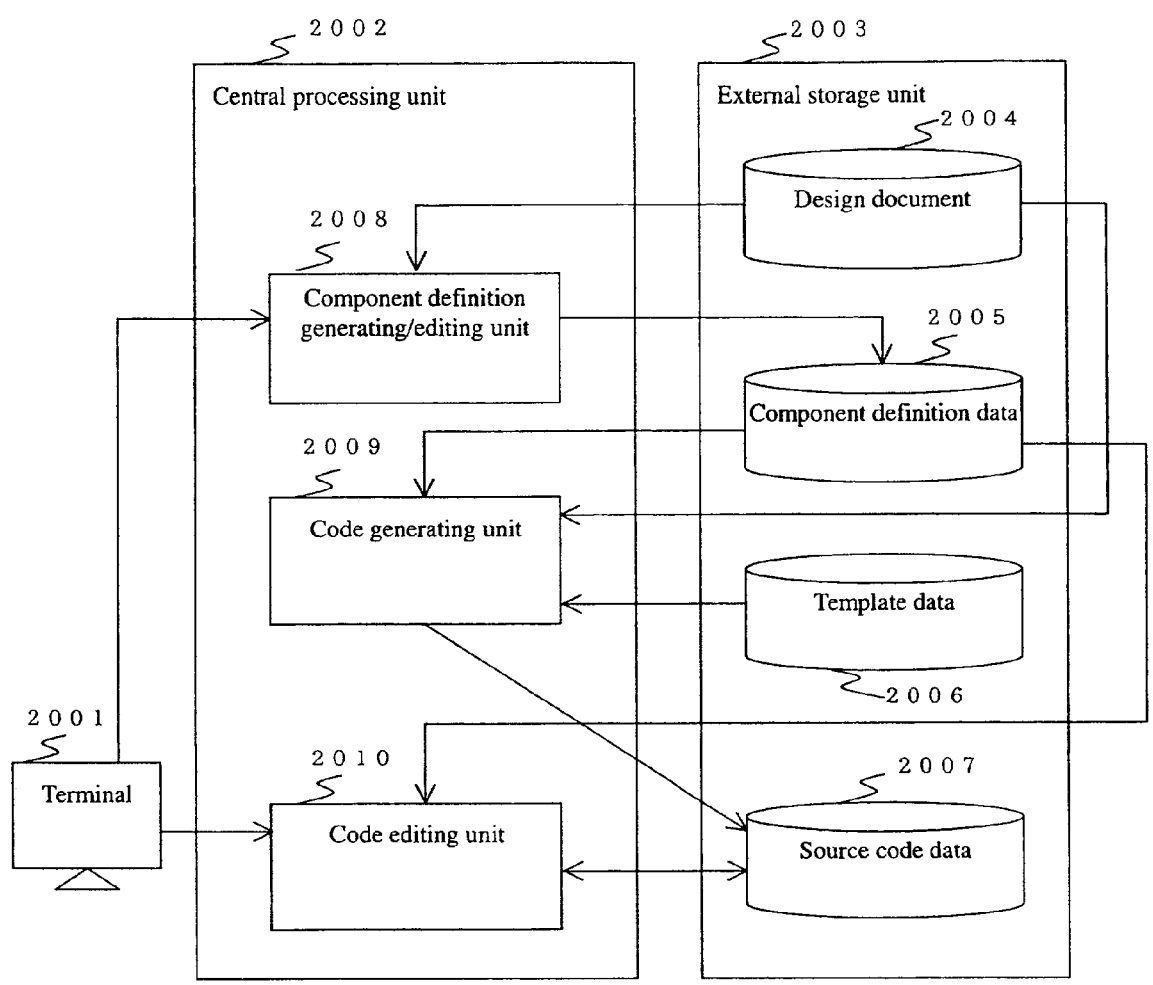
Fig.20 System configuration

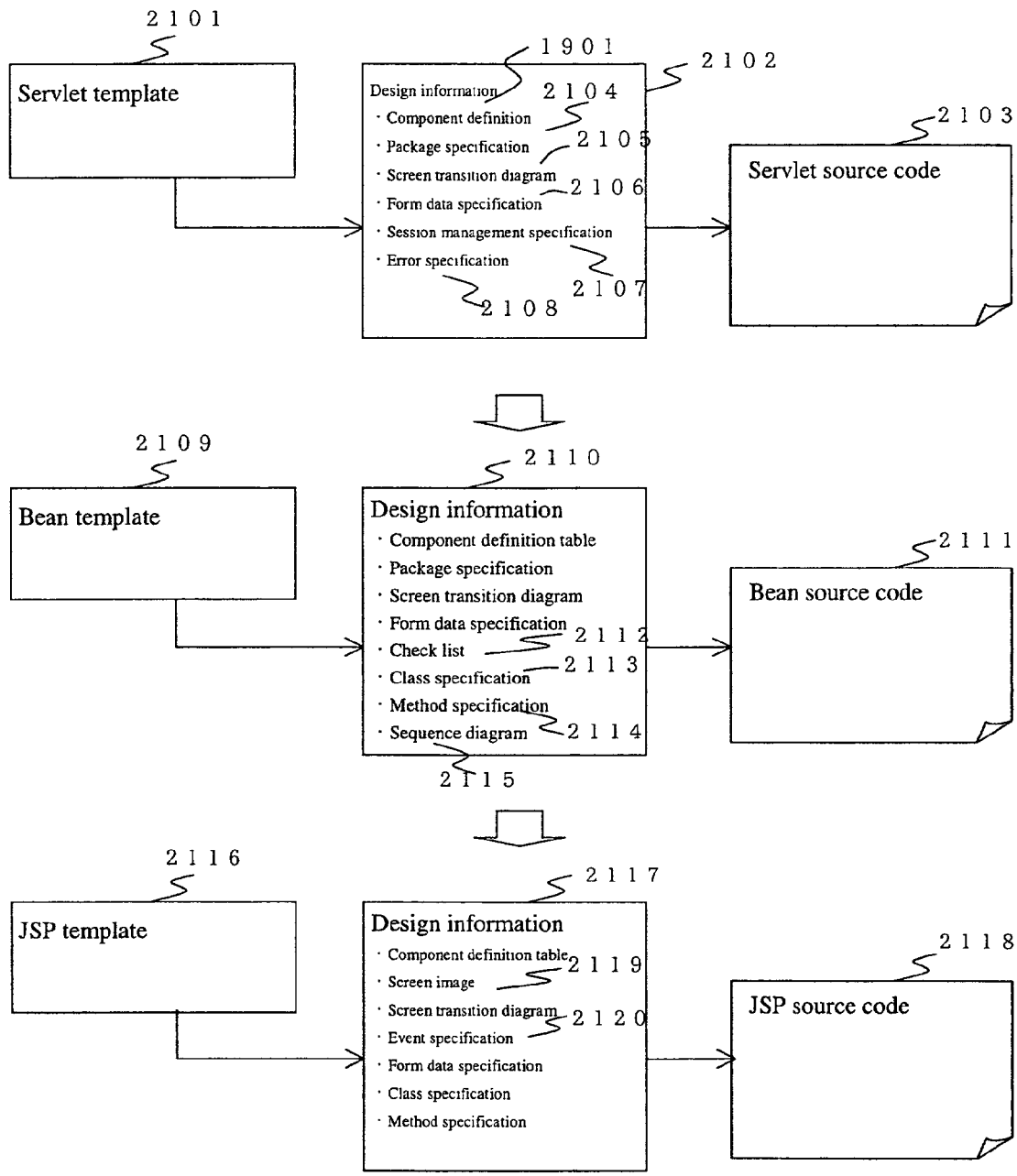
Fig.21 Development procedure

Fig.22 Flowchart for generating component definition table
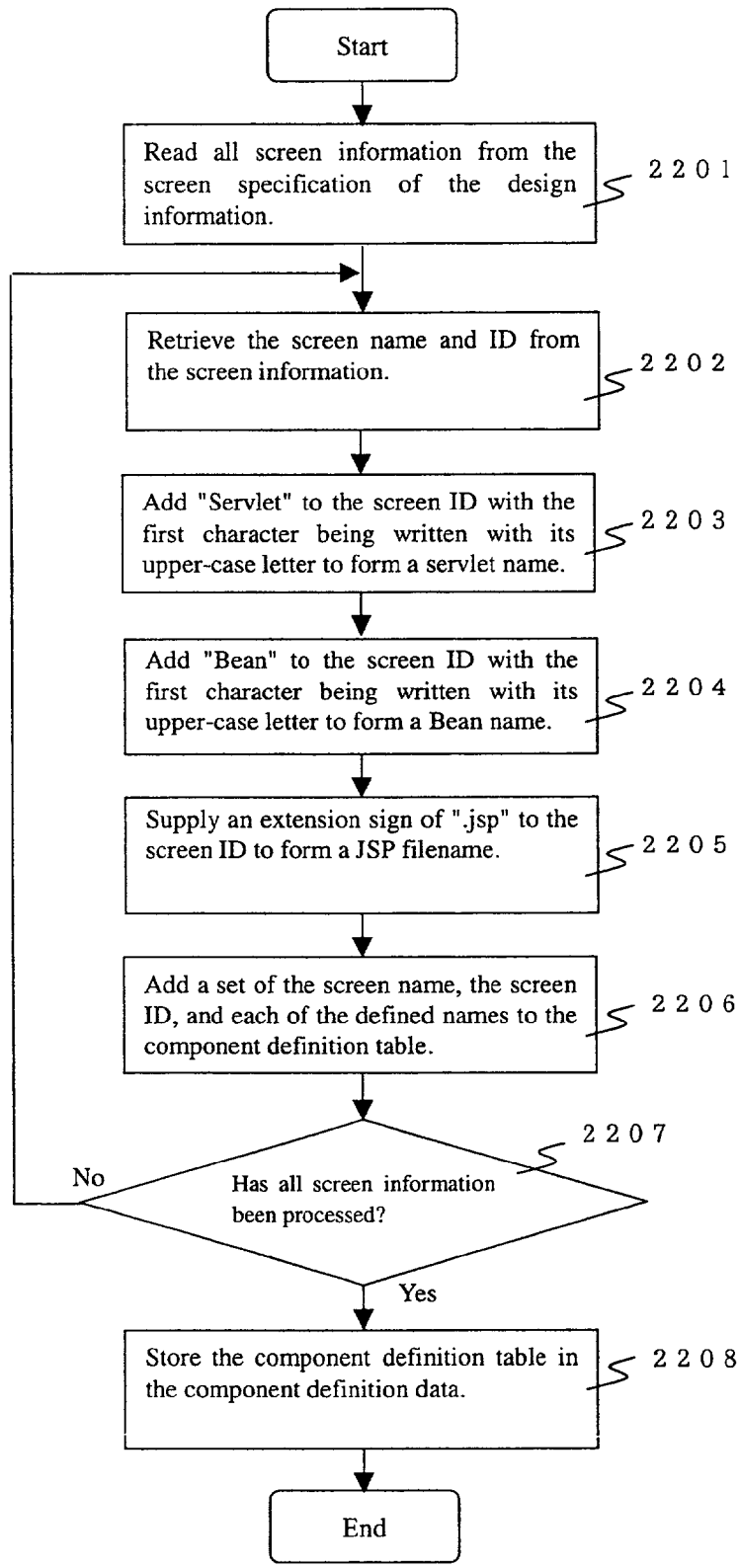

Fig.23 Flowchart for automatically generating a source code
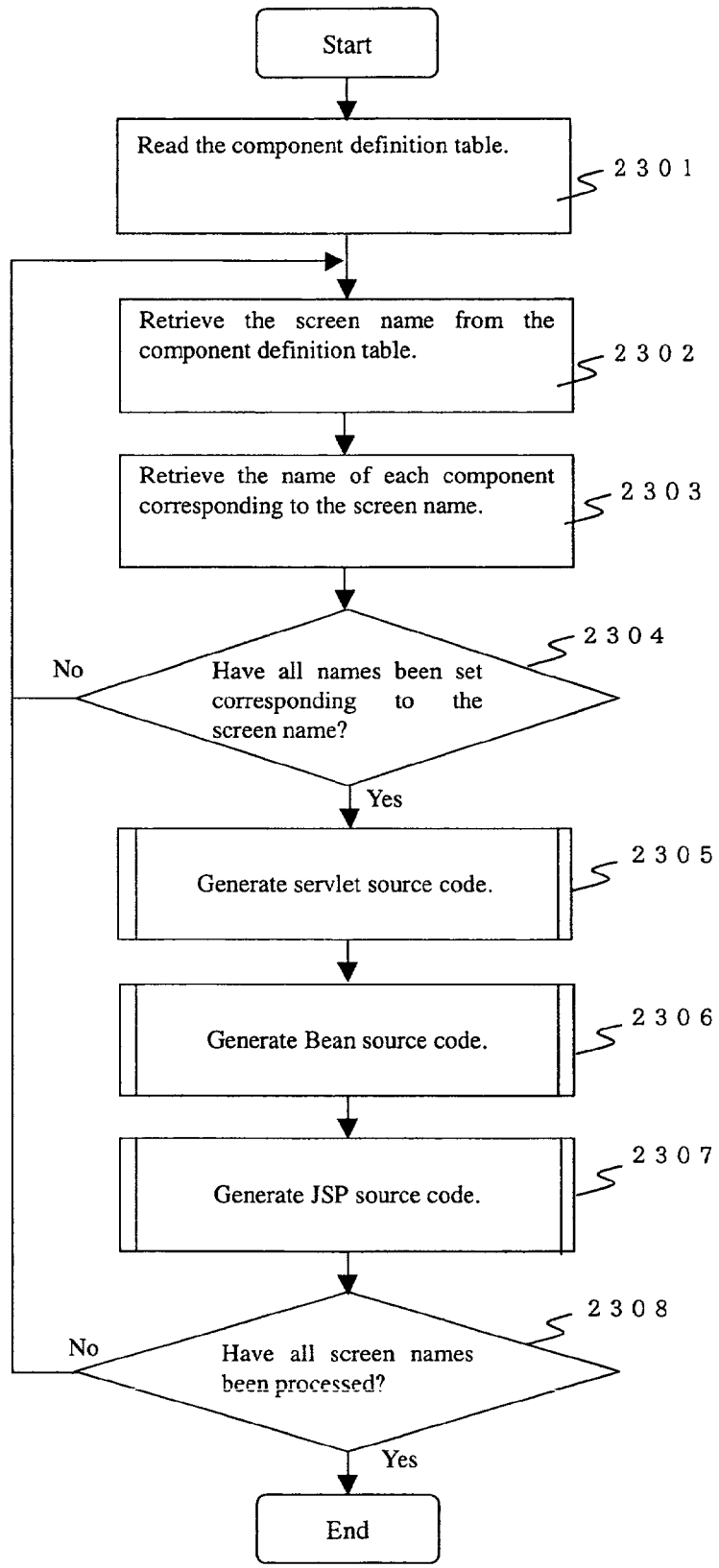

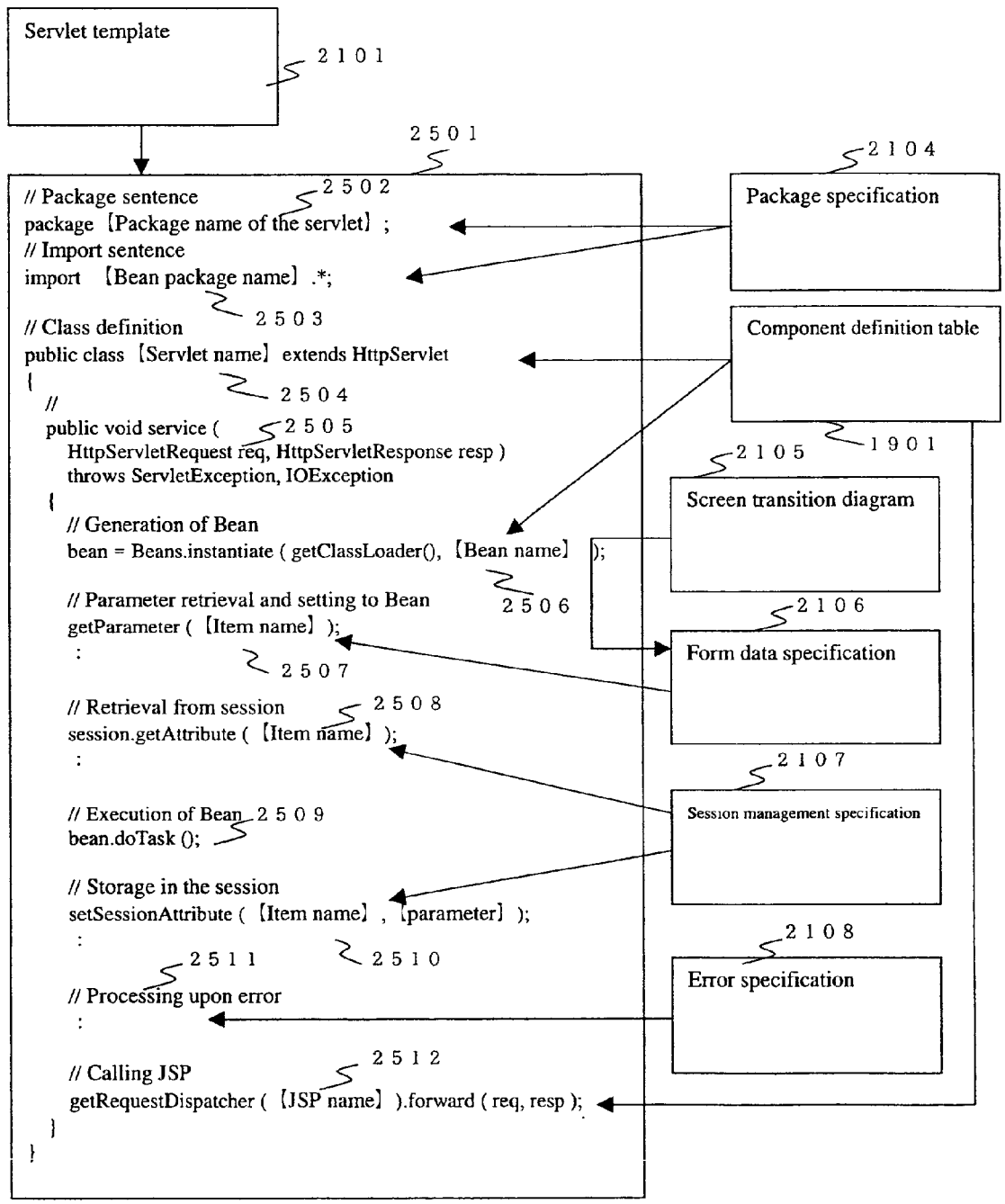
Fig.25 Example of generating a servlet source code

Fig.26 Generation of a servlet source code
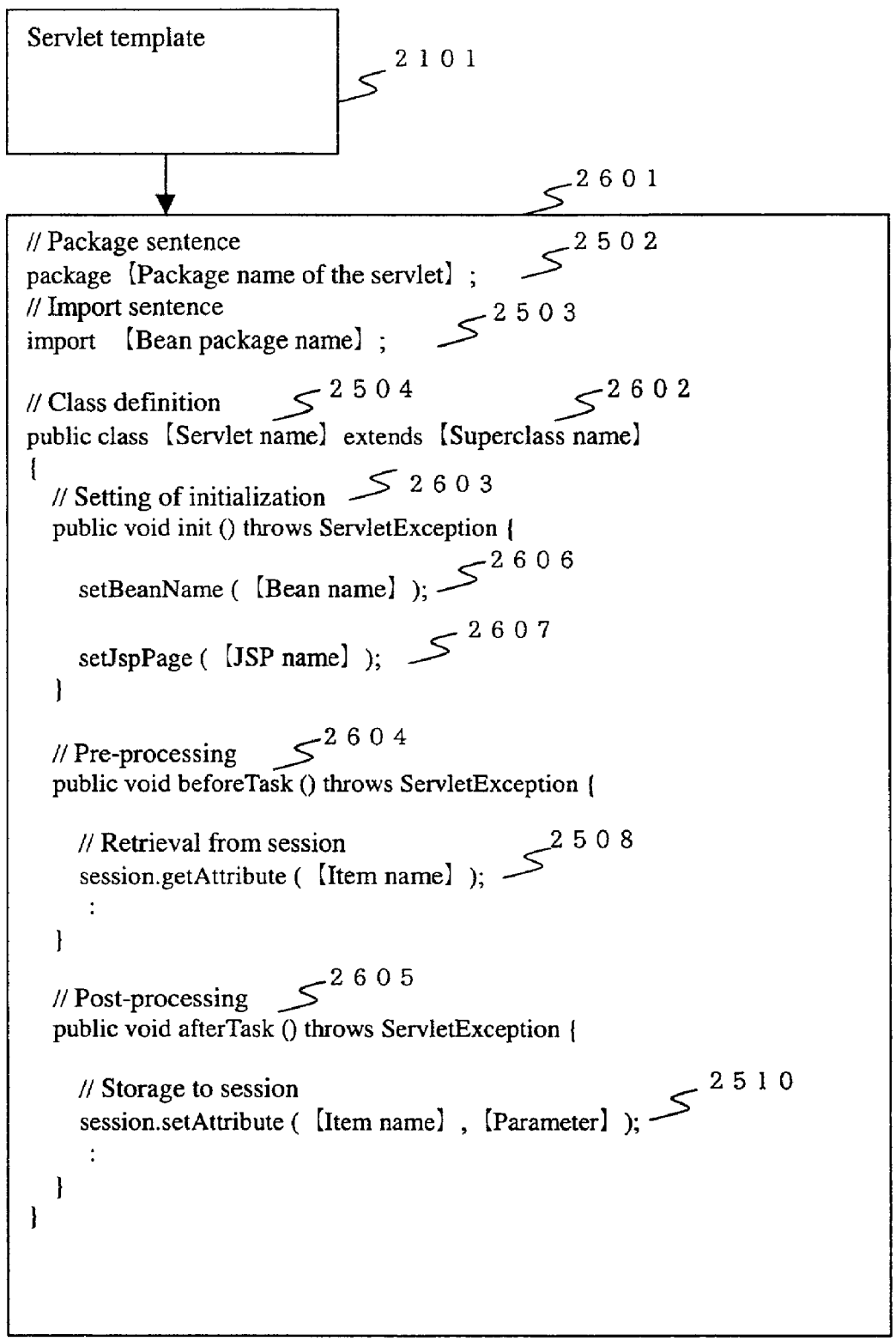

Fig.27 Servlet superclass code

```
                                                    2701              2702
public abstract class BaseServlet extends javax.servlet.http.HttpServlet
{
    private String jspname;           // JSP name        2703
    private String beanname;          // Bean name
    private BaseBean bean;            // Bean object
                                                         2704
    abstract public void init () throws ServletException ;

public void service ( HttpServletRequest req, HttpServletResponse resp )
    throws ServletException, IOException
    {                                          2705
        try {
            create ();            // Bean generation
            beforeTask ();        // Pre-processing
            doTask ();            // Bean execution
            afterTask ();         // Post-processing
            callJsp ();           // JSP call
        } catch (Exception e ) {
            error ();             // Error processing
        }                2706
    }
    private void create ()throws ServletException {
        // Processing for generating Bean
    }                                       2707
    protected void beforeTask () throws ServletException {
        // To be implemented in subclass if necessary
    }                                              2708
    private void doTask ()throws ServletException {
        // Processing for executing Bean
    }                                       2709
    protected void afterTask () throws ServletException {
        // To be implemented in subclass if necessary
    }                                              2710
    private void callJsp () throws ServletException {
        // Processing for calling JSP
    }                                    2711
    private void error () throws ServletException {
        // Error processing
    }                          2712
    void setJspPage ( String name ) { this.jspname = name; }
    String getJspPage () { return jspname; }
    void setBeanName ( String name) { this.beanname = name; }
    String getBeanName () { return beanname; }
}
```

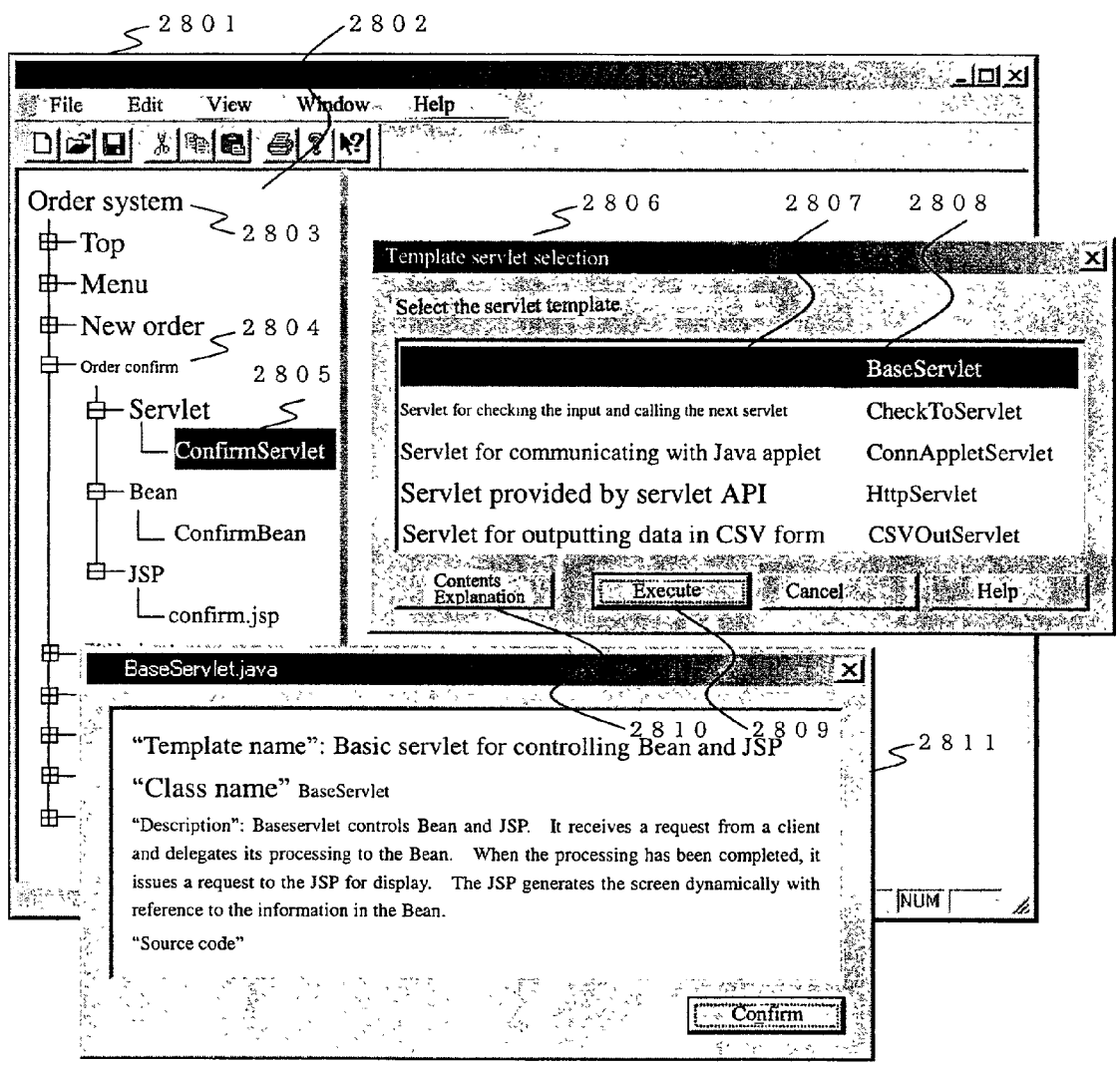
Fig.28 Image of template selection

Fig.29 Image of template selection
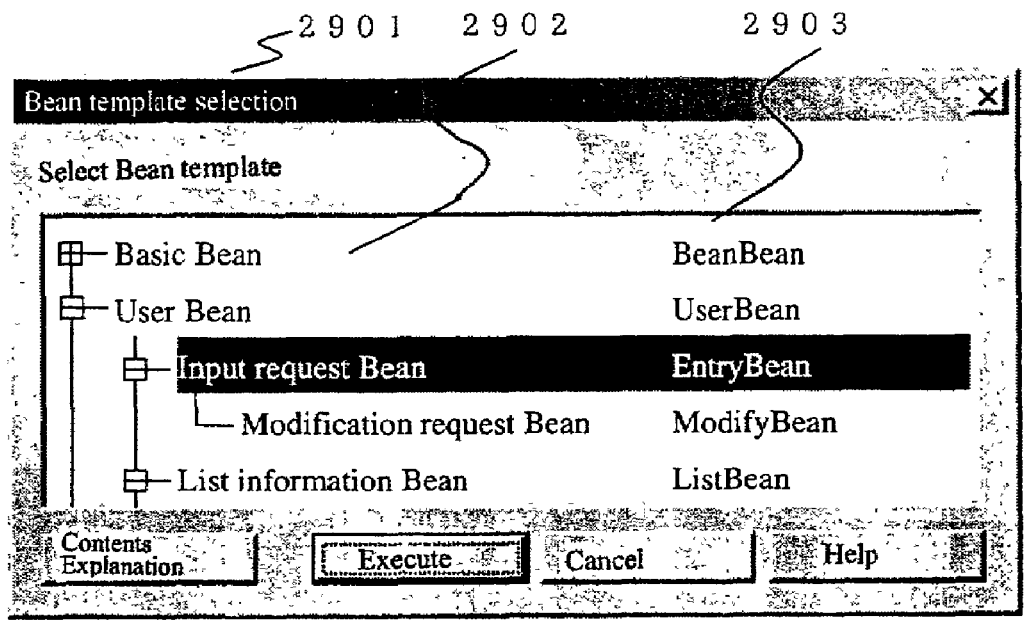
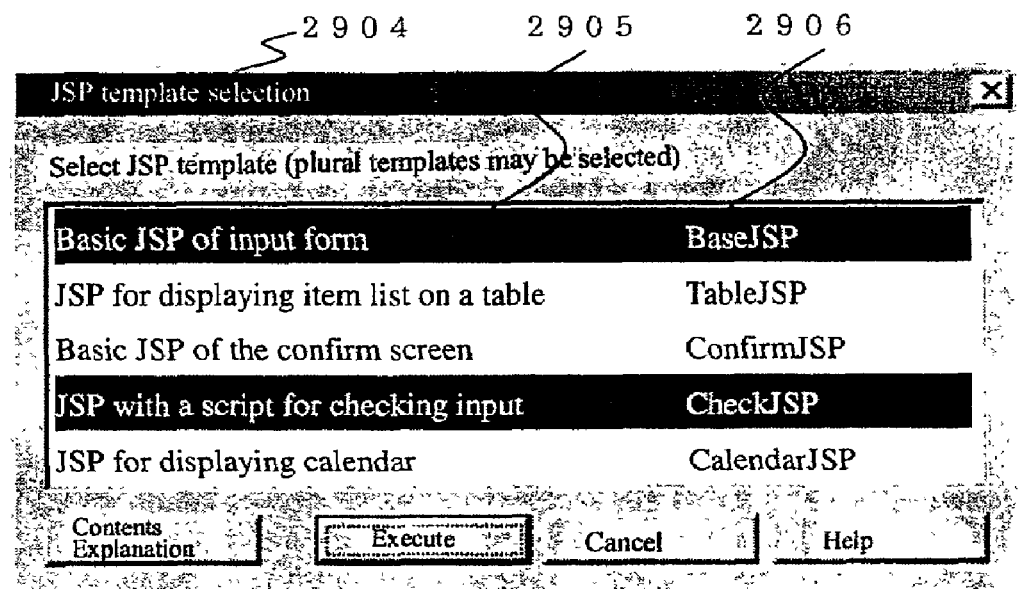

Fig.31 Example of generating a Bean source code

Fig.32 Relationship between screen information and Bean

Fig.33 Flowchart for automatically generating a JSP source code

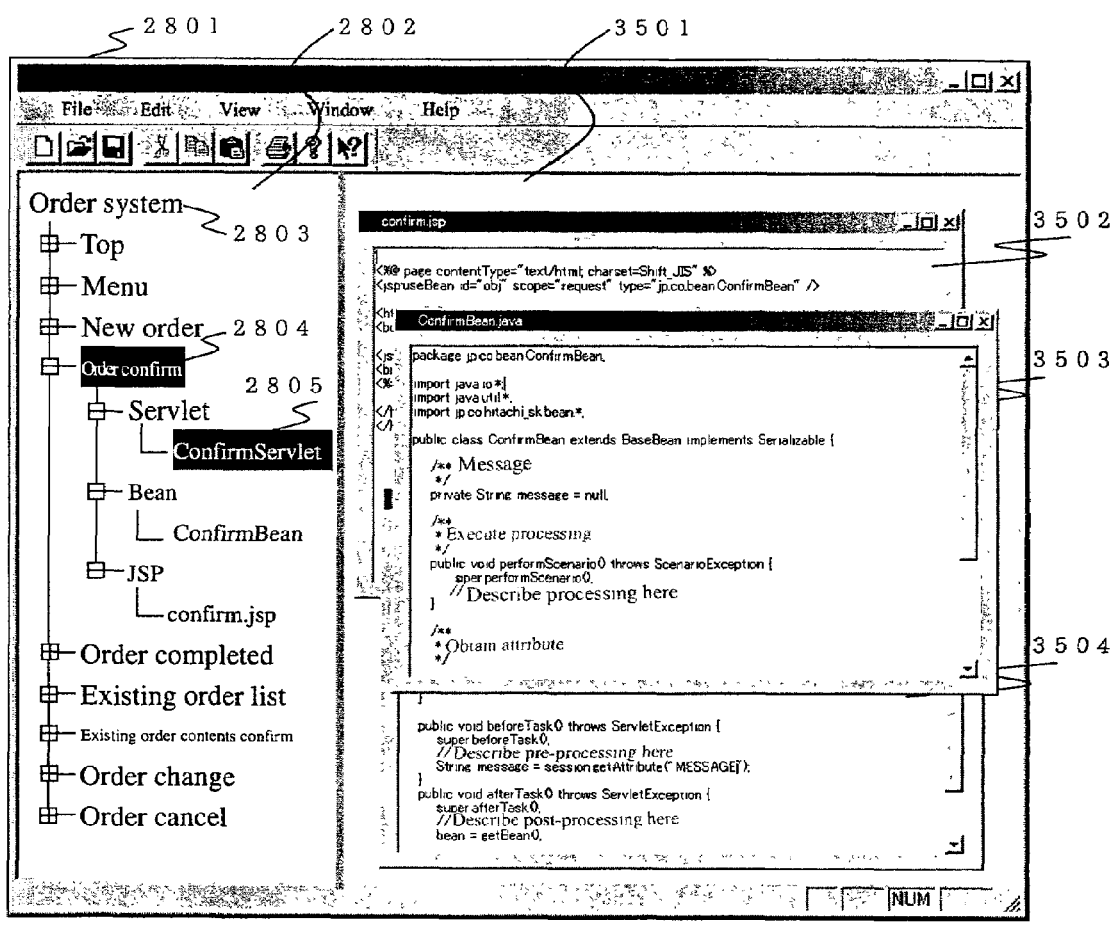
Fig.35 Image of editing source codes

METHOD FOR DEVELOPING WEB APPLICATIONS, DEVELOPMENT SUPPORT SYSTEM AND STORAGE MEDIUM FOR STORING PROGRAMS DEVELOPED ACCORDING TO THE METHOD

BACKGROUND OF THE INVENTION

1. Field of the Invention

The present invention relates to a method for developing a Web application and to a development support system. More particularly, it relates to a support technology for designing and developing a servlet, JSP (Java™ Server Pages), and JavaBeans™ component (a Bean) in a Web application system which employs the server-side Java™ technology.

2. Detailed Description of the Prior Arts

Recently, in a Web application system on the Inter- and Intranet, such a system has come into widespread use that makes use of the server-side Java™ technology. Conventional Web systems typically employ CGI (Common Gateway Interface) programs.

However, servlets are substituting for the CGI to become mainstream in the development of systems. The servlet provides the functionality similar to the CGI and is a server-side program for executing on a server for a request sent from a client (Web browser) and then sending back the resulting data to the client.

It is the most basic that the servlet is used as follows. The servlet is activated according to a request sent from a Web browser to gain access to a database, receive, and then process the resulting data. In addition, the servlet performs branched processing or calls other servlets according to the contents of the request to send back the resulting data to the Web browser. In some cases, JSP's are employed instead of the servlet. The JSP technology is a major extension to write Java™ codes into HTML file and can be combined with the servlet to be used together.

In a conventional system configured by employing the servlet, JSP, and Bean, the Bean accesses databases as well as performs business transactions, also acts to hold the resulting data. Designing and developing the Bean used to require knowledge and experience on Java™ more than the development of the JSP. In addition, in the conventional development, each component was shared on the server side to develop separately a servlet, JSP and Bean that is utilized by them. Thus, as can be seen in the waterfall development, it was necessary to clearly define the target of development in advance.

In recent system developments, the development cycle time has been increasingly made shorter. In particular, to make a business system or a business service public on the Web, customers require strongly to make the development cycle time shorter. Thus, in a Web application system, it is required not only to periodically update the design or information of Web pages but also to make a new service public as soon as possible on the system or quickly extend the service, that is, to complete development in a shorter period of time. To cope with these customer needs as well as a shorter development cycle time for Web application systems, it is necessary to alleviate the burden on developers or programmers and provide a significant speedup in the development.

Furthermore, the conventional development method allowed the servlet and JSP to perform processing according to a request and then describe a program for creating a screen in accordance with the resulting data. Accordingly, this caused the system to become larger, and made it necessary for individual developer to have wider knowledge on Java™ as the system and programming became more complicated, and collect Java™ programs for the development. The developers or programmers were further burdened with understanding the processing performed by the servlet or JSP to be developed, coding, debugging, and maintenance thereof.

When each servlet and Bean employed by the servlet were independently developed, they could not be combined together to check the overall operation until developers provided their classes. On the other hand, when the servlet and Bean are independently developed, it is impossible to achieve commonality since the developers develop a servlet, JSP, and Bean independently of one another. This made the development dependent on the skill of each developer and the maintenance difficult to be carried out.

SUMMARY OF THE INVENTION

The present invention was developed to solve the aforementioned problems. That is, an object of the present invention is to alleviate the burden on developers or programmers who design and develop a servlet, JSP, Bean in a Web application system that employs the server-side Java™ technology, thereby providing a speedup in the design and development.

To achieve the aforementioned object, a first aspect of the present invention provides a Web application development method for developing, on the Inter- and Intranet, a Web application system having server-side Java™ technologies such as a servlet, JSP, and JavaBeans™ component (Bean). The method is characterized in that in accordance with a GUI specification provided by a design specification for said Web application system, a source filename of each component of the servlet, JSP, and Bean is defined corresponding to each screen image to develop the servlet, JSP, and Bean.

A second aspect of the present invention is a Web application development method for developing, on the Inter- and Intranet, a Web application system having server-side Java™ technologies such as a servlet, JSP, and JavaBeans™ component (Bean). The method is characterized in that in accordance with a GUI specification provided by a design specification for said Web application system, a source filename of each component of the servlet, JSP, and Bean is defined in a one-to-one relationship corresponding to each screen image to develop the servlet, JSP, and Bean.

A third aspect of the present invention is characterized in that, in the first or second aspect, a source code of each component is automatically generated using the relationship between said screen and a source filename of each component of said servlet, JSP, and Bean, and information of said design specification.

A fourth aspect of the present invention is characterized in that, in the first or second aspect, said Bean component is provided with all pieces of information necessary for displaying an HTML page, and serves to carry out mapping information of an HTML page and information to be retrieved from a database.

A fifth aspect of the present invention is characterized in that, in the third aspect, upon generation of the source code of each component of said servlet, JSP, and Bean, a template list is displayed for each component to be generated, a template selected from the template list is employed as a model, and a code is written to the model in accordance with said design specification to automatically generate a source code.

A sixth aspect of the present invention is a Web application development method for developing, on the Inter- and Intranet, a Web application system having server-side Java™ technologies such as a servlet, JSP, and JavaBeans™ component (Bean). The method is characterized by comprising the step of reading a GUI specification provided by a design specification to generate each component name of a servlet, JSP, and/or Bean corresponding to a screen name for each screen. The method also comprises the step of selecting a template from a template list with respect to each component of a generated name, the template being a model of a source file of the component. The method further comprises the step of generating automatically a source code of the component by writing the code to said template in accordance with a design specification of the component.

A seventh aspect of the present invention is characterized in that, in the sixth aspect, said template list includes a superclass template, and the step of generating automatically said source code is to inherit said superclass to create said source code.

An eighth aspect of the present invention is characterized in that, in the sixth aspect, said step of generating a name of each component is to generate a name of each component of a servlet, JSP, and/or Bean in a one-to-one relationship with a screen name for said each screen.

A ninth aspect of the present invention is characterized in that, in any of the first–eighth aspects, in a Web application system to be developed, the servlet serves to receive a request from a Web browser; the Bean serves to perform processing in accordance with the request of the servlet to hold resulting data; and the JSP serves to retrieve the resulting data of the Bean to generate an HTML displayed on the Web browser. Thus, each role of the servlet, JSP, and Bean is separated from each other.

A tenth aspect of the present invention is a program provided by a method for developing a Web application according to any one of the foregoing aspects.

An eleventh aspect of the present invention is a storage medium for storing a program provided by a method for developing a Web application according to any one of the first to the ninth aspects.

A twelfth aspect of the present invention is a Web application development system for developing, on the Inter- and Intranet, a Web application system having server-side Java™ technologies such as a servlet, JSP, and JavaBeans™ component (Bean). The system is characterized by comprising means for developing the servlet, JSP, and Bean by defining a source file name of each component of the servlet, JSP, and Bean corresponding to each screen image, in accordance with a GUI specification provided by a design specification for said Web application system.

A thirteenth aspect of the present invention is a Web application development system for developing, on the Inter- and Intranet, a Web application system having server-side Java™ technologies such as a servlet, JSP, and JavaBeans™ component (Bean). The system is characterized by comprising means for developing the servlet, JSP, and Bean by defining a source filename of each component of the servlet, JSP, and Bean in a one-to-one relationship corresponding to each screen image, in accordance with a GUI specification provided by a design specification for said Web application system.

A fourteenth aspect of the present invention is characterized in that, in the twelfth or thirteenth aspect, by further comprising means for automatically generating a source code of each component, using the relationship between said screen and a source filename of each component of said servlet, JSP, and Bean, and information of said design specification.

A fifteenth aspect of the present invention is characterized in that, in the twelfth or thirteenth aspect, said Bean component is provided with all pieces of information necessary for displaying an HTML page, and serves to carry out mapping information of an HTML page and information to be retrieved from a database.

A sixteenth aspect of the present invention is characterized in that, in the fourteenth aspect, by further comprising, upon generation of the source code of each component of said servlet, JSP, and Bean, means for displaying a template list for each component to be generated, for employing a template selected from the template list as a model, and for writing a code to the model in accordance with said design specification to automatically generate a source code.

A seventeenth aspect of the present invention is a Web application development system for developing, on the Inter- and Intranet, a Web application system having server-side Java™ technologies such as a servlet, JSP, and JavaBeans™ component (Bean). The system is characterized by comprising means for reading a GUI specification provided by a design specification to generate each component name of a servlet, JSP, and/or Bean corresponding to a screen name for each screen. The system is also characterized by comprising means for selecting a template from a template list with respect to each component of a generated name, the template being a model of a source file of the component. The system is also characterized by comprising means for generating automatically a source code of the component by writing the code to said template in accordance with a design specification of the component.

An eighteenth aspect of the present invention is characterized in that, in the seventeenth aspect, said template list includes a superclass template, and the means for generating automatically said source code are to inherit said superclass to create said source code.

A nineteenth aspect of the present invention is characterized in that, in the seventeenth aspect, said means for generating a name of each component is to generate a name of each component of a servlet, JSP, and/or Bean in a one-to-one relationship with a screen name for said each screen.

A twentieth aspect of the present invention is characterized in that, in any one of the twelfth to nineteenth aspects, in a Web application system to be developed, the servlet serves to receive a request from a Web browser; the Bean serves to perform processing in accordance with the request of the servlet to hold resulting data; and the JSP serves to retrieve the resulting data of the Bean to generate an HTML displayed on the Web browser. Thus, each role of the servlet, JSP, and Bean is separated from each other.

That is the present invention is characterized by comprising a component table for defining in list form the source filename of each component of the servlet, JSP, and Bean in a one-to-one relationship corresponding to each screen image of the GUI specification provided by a design document. The invention is also characterized by comprising an automatic code generating unit for automatically extracting and generating, as a source code, the name, variable, and method definition of each component of the servlet, JSP, and Bean, and the call relationship among the components by making use of the information of the component table and the design document. Template data that includes a code or template of each component, used upon generation of source codes in the automatic code generating unit, is stored in a predetermined external storage unit. Also stored therein are source codes or servlet superclasses and source codes of each component generated.

As described above, in the development of a Web application system, the source filename of each component of the servlet, JSP, and Bean is defined in a one-to-one relationship corresponding to each screen image. This makes it possible to clarify the relationship between each of the components. Furthermore, each screen can be developed independently by standardizing the processing of the servlet, JSP, and Bean.

Furthermore, the relationship between each of the components is made clear for each screen and their respective roles are designed to be separate from each other, thereby making it possible to cope readily with a complicated system or extend easily the function of the system. Use of the server-side Java™ technology would make it possible to separate the roles of the servlet, JSP, and Bean from each other in a manner such that the servlet serves to receive a request from a Web browser; the Bean serves to perform processing in accordance with the request of the servlet to hold resulting data; and the JSP serves to retrieve the resulting data of the Bean to generate an HTML displayed on the Web browser. In particular, the invention is characterized in that the Bean is designed to have all pieces of information necessary for displaying an HTML page using the resulting classes provided by the analysis and design of business rules or classes for accessing a database.

BRIEF DESCRIPTION OF THE DRAWINGS

FIG. 8 is a view depicting an example of a servlet superclass source code.

FIG. 9 is a view depicting an example of a flowchart for automatically generating a JSP source code.

FIG. 11 is a view depicting an example of a flowchart for automatically generating a Bean source code.

FIG. 14 is a view depicting the overall configuration of a Web application system which employs the servlet, JSP, and Bean, according to a second embodiment.

FIG. 15 depicts the relationship between the recipient component and the response component, which are employed in a Web application system according to the second embodiment.

FIG. 16 is a view depicting a (first) example of defining a one-to-one relationship between the recipient and response components.

FIG. 17 is a view depicting a (second) example of defining a one-to-one relationship between the recipient and response components.

FIG. 18 is a view depicting a (first) example of a component definition table of components.

FIG. 19 is a view depicting a (second) example of a component definition table of components.

FIG. 20 is a view depicting an example of the configuration of a system for designing and developing a Web application system.

FIG. 21 is a view depicting an example of a development procedure for designing and developing a Web application system.

FIG. 22 is a flowchart depicting a flow for generating a component definition table.

FIG. 23 is a flowchart depicting a flow for automatically generating a source code.

FIG. 25 is a view depicting a (first) example of generating a servlet source code.

FIG. 26 is a view depicting a (second) example of generating a servlet source code.

FIG. 27 is a view depicting an example of a servlet superclass code.

FIG. 28 is a view depicting a (first) image of selecting a template.

FIG. 29 is a view depicting a (second) image of selecting a template.

FIG. 35 is a view depicting an image of editing a source code.

DETAILED DESCRIPTION OF THE PREFERRED EMBODIMENTS

Now, embodiments of the present invention are explained specifically with reference to the accompanying drawings.

Figure 3:
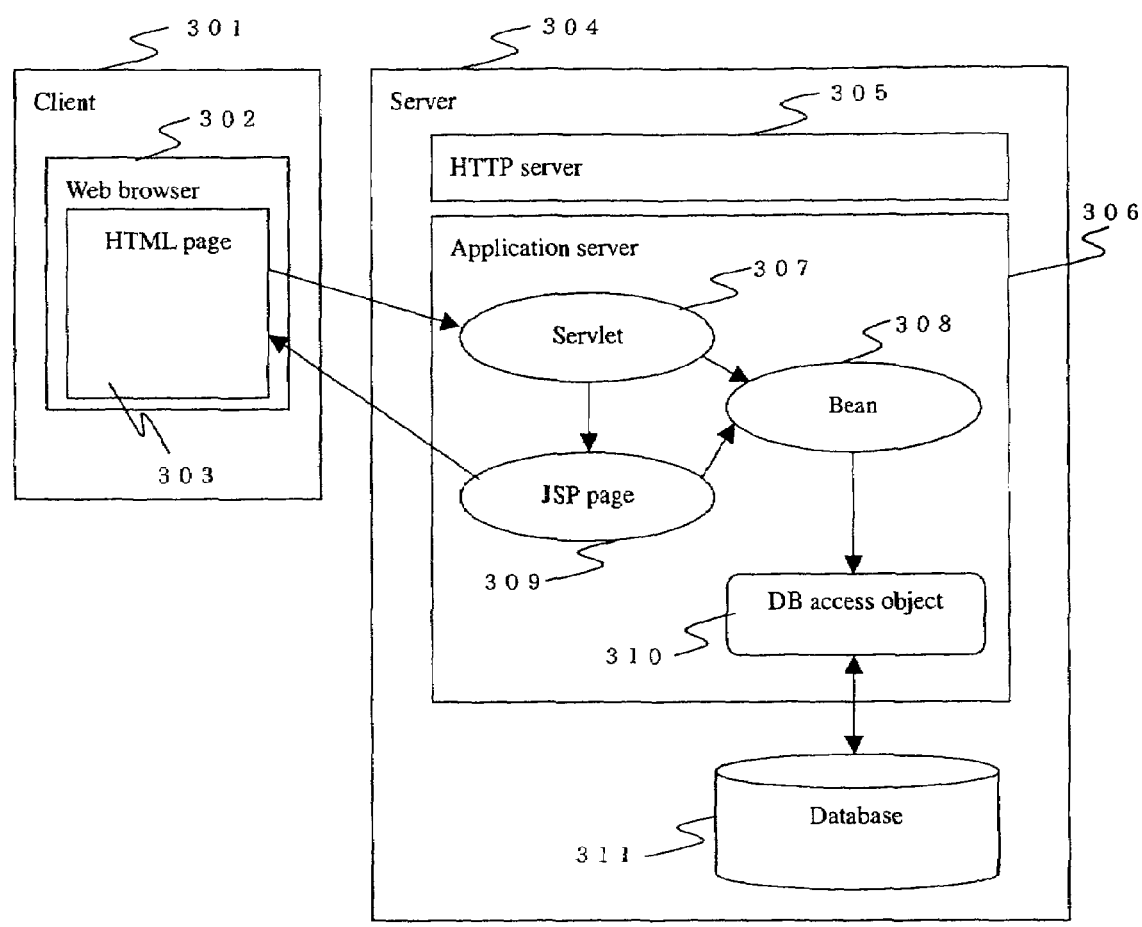
FIG. 3 is a view depicting an example of the overall configuration of a Web application system which employs the servlet, JSP, and Bean.

A first embodiment according to the present invention is explained below. Here, such an example is explained in which a Web application system employing the servlet, JSP, and Bean, described later with reference to FIG. 3, is designed and developed. In particular, the present invention is characterized in that the source file name of each of the components of the servlet, JSP, and Bean is defined as a component table by being associated in a one-to-one relationship with each of the screens of the GUI specification in the design document. Using the information in the component table and the design document, the name and variable of each component of the servlet, JSP, and Bean, the definition of methods, and each call relationship among the components are automatically extracted to automatically generate source codes.

Figure 1:
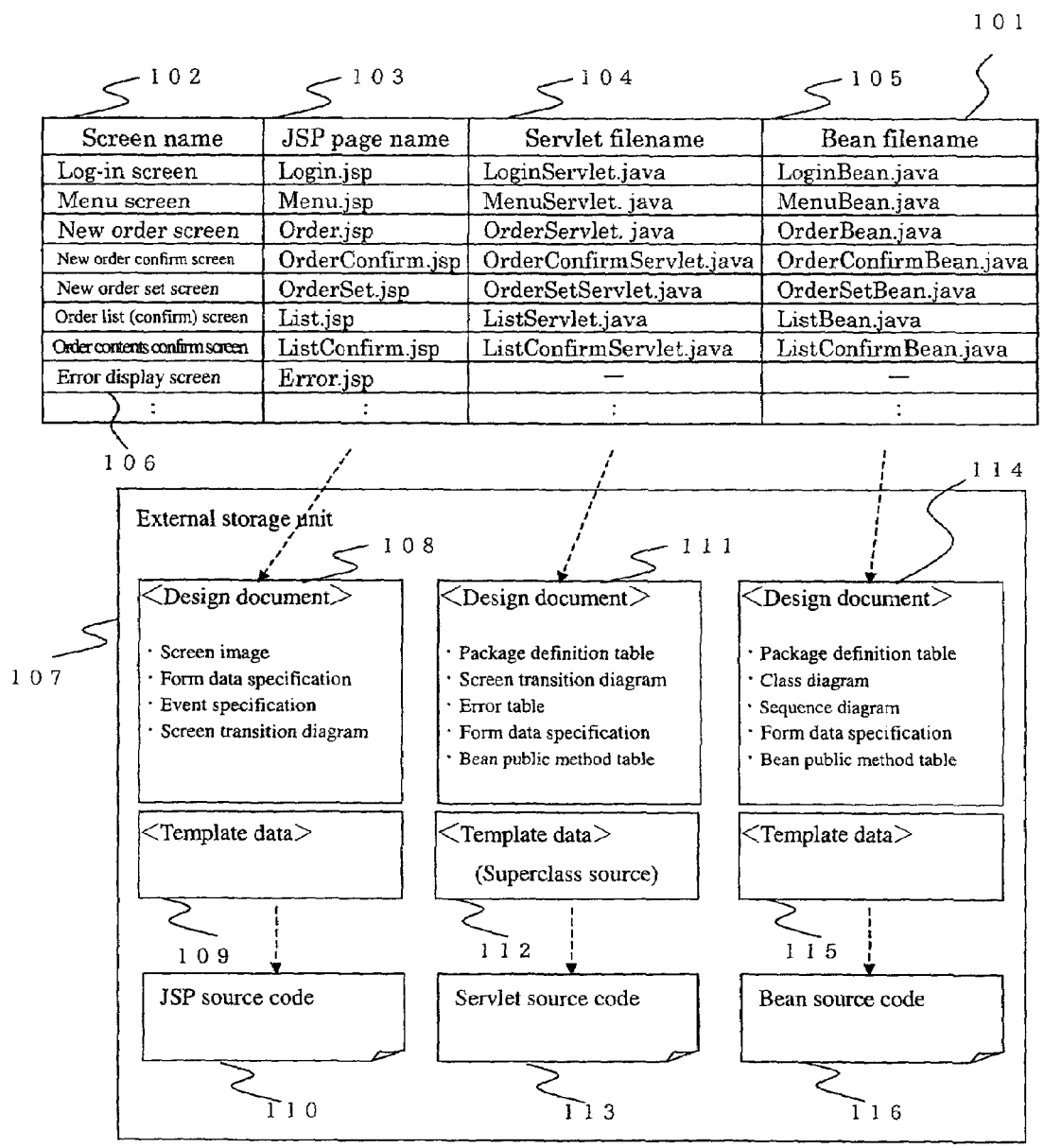
FIG. 1 is a view depicting an example of a component table representative of the relationship among the screen, the servlet, JSP, and Bean of a Web application system to be developed.

FIG. 1 is a view depicting an example of a component table representative of the relationship among the screen, the servlet, JSP, and Bean of the Web application system to be designed and developed in this embodiment. The component table 101 comprises the screen name 102, the JSP name 103, the servlet filename 104, and the Bean filename 105, where each filename is defined to be associated in a one-to-one relationship with each screen image. It will be understood that the JSP name 103 has an extension sign of ".jsp", and the servlet filename 104 and Bean filename have an extension sign of ".java". For example, for the screen name of the "New Order Screen", the JSP name 103 is "Order.jsp", while the servlet filename 104 is a JSP name 103 added by "Servlet", or the "OrderServlet.java". Similarly, the Bean filename 105 is a JSP name 103 added by "Bean", or the "OrderBean.java". An "Error display screen" 106 is not associated in a one-to-one relationship with the servlet and Bean but is called by some servlets, and thus only the "Error.jsp" is defined according to the JSP name 103.

Referring to FIG. 1, reference numeral 107 designates an external storage unit for storing a variety pieces of information. The external storage unit 107 stores information necessary to generate the source codes 110, 113, 116 of each of the components of the servlet, JSP, and Bean, which are defined in the component table 101. Reference numerals 108 and 109 designate information necessary to generate the JSP source code 110 and comprising a design document 108 for describing screen images, form data specifications, event specifications, and screen transition diagram; and template data 109. Reference numerals 111 and 112 designate information necessary to generate the servlet source code 113 and comprising a design document 111 for describing package definition tables, screen transition diagrams, error tables, form data specifications, and Bean public method tables; template data 112, and servlet superclass source code data. Reference numerals 114 and 115 designate information necessary to generate the Bean source code 116 and comprising a design document 114 for describing package definition tables, class diagrams, sequence diagrams, form data specifications, and Bean public method tables; and template data 115.

Figure 2:
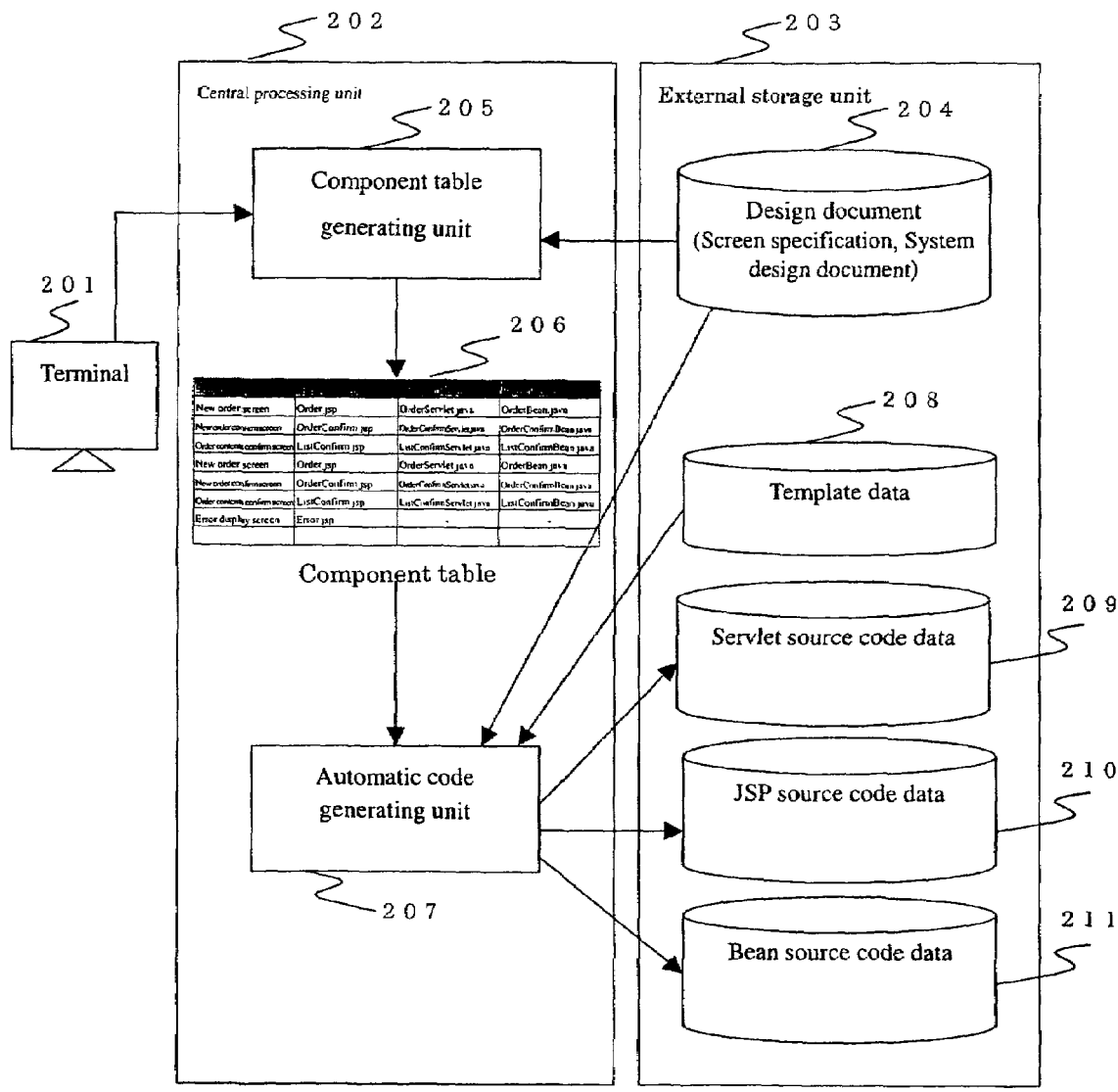
FIG. 2 is a view depicting an example of the configuration of a system according to an embodiment.

FIG. 2 is a view depicting an example of the configuration of a system for designing and developing a Web application system. Referring to FIG. 2, reference numeral 201 designates a terminal for inputting commands and operation with a mouse; reference numeral 202 designates a central processing unit for storing functionality and data for implementing the present invention; and reference numeral 203 designates an external storage unit for storing various pieces of information. A design document 204 stored in the external storage unit 203 includes GUI specifications to be obtained from the requirements and business specifications provided by customers for the development of a Web application system, and HTML files representative of screen design and each screen image. Referring back to FIG. 1, the design documents, template data, and source codes generated, designated by reference numerals 108 to 116, are stored in the external storage unit 203. In the external storage unit 203, also stored is the servlet superclass source code data 212.

The functionality stored in the central processing unit 202 comprises a component table generating unit 205 for reading screen information from the GUI specification stored in the design document 204 to generate a component table 206 representative of the relationship among the screen, servlet, JSP, and Bean. The functionality also comprises an automatic code generating unit 207 for automatically generating each source code of the servlet, JSP, and Bean by making use of a component table 206, the information of the design document 204 such as the GUI specification and a system design document, and template data 208. The template data 208 includes source codes which are used as a template for each component upon generation of source codes and which form superclasses in the servlet. Each source code generated by the automatic code generating unit 207 is stored in servlet source code data 209, JSP source code data 210, and Bean source code data 211.

FIG. 3 is a view depicting an example of the overall configuration of a Web application system which employs the servlet, JSP, and Bean, generated by the automatic code generating unit 207 of the system according to this embodiment. This Web application system is used by a Web browser 302 on a client 301. A HTML page 303 is displayed on the Web browser 302. A request from the Web browser 302 is sent to a server 304 via HTTP. The server 304 comprises a HTTP server 305 and an application server 306 which in turn includes a runtime environment of the servlet and JSP.

The servlet, JSP, and Bean, generated by the automatic code generating unit 207, are each executably arranged on the application server 306 of the server 304. Sending a request to the server 304 will cause a corresponding servlet 307 to execute according to the request. The servlet 307 issues a request to a corresponding Bean 308 to perform processing. Then, the Bean 308 uses a DB access object 310 to access a database 311 and then perform processing related to business and data processing, then holding the resulting data. The DB access object 310 is a class created through the analysis and design of business rules, or an existing reusable class. Subsequently, the servlet 307 passes the Bean 308 to a JSP 309 to call the JSP 309. By retrieving the resulting data held in the Bean 308, the JSP 309 generates and then sends an HTML page back to the client 301. The HTML page sent back as such is displayed on the Web browser 302. Here, the servlet 307, JSP 309, and Bean 308 are defined in a one-to-one relationship with the HTML page 303 to be displayed on the Web browser 302.

The servlet 307 receives a request from the Web browser 302, issues the request to the Bean 308, and calls the JSP 309, thus serving to connect between and control each of them. The JSP 309 serves to display the output of an HTML page, while the Bean 308 serves for business transactions. Without using the Bean 308 and the JSP 309, it is also possible to process a request from the Web browser 302 only with the servlet 307. However, using the Bean 308 and the JSP 309 makes it possible to clearly separate their respective roles, thereby allowing each of their functions to be grasped in a simple manner.

Figure 4:
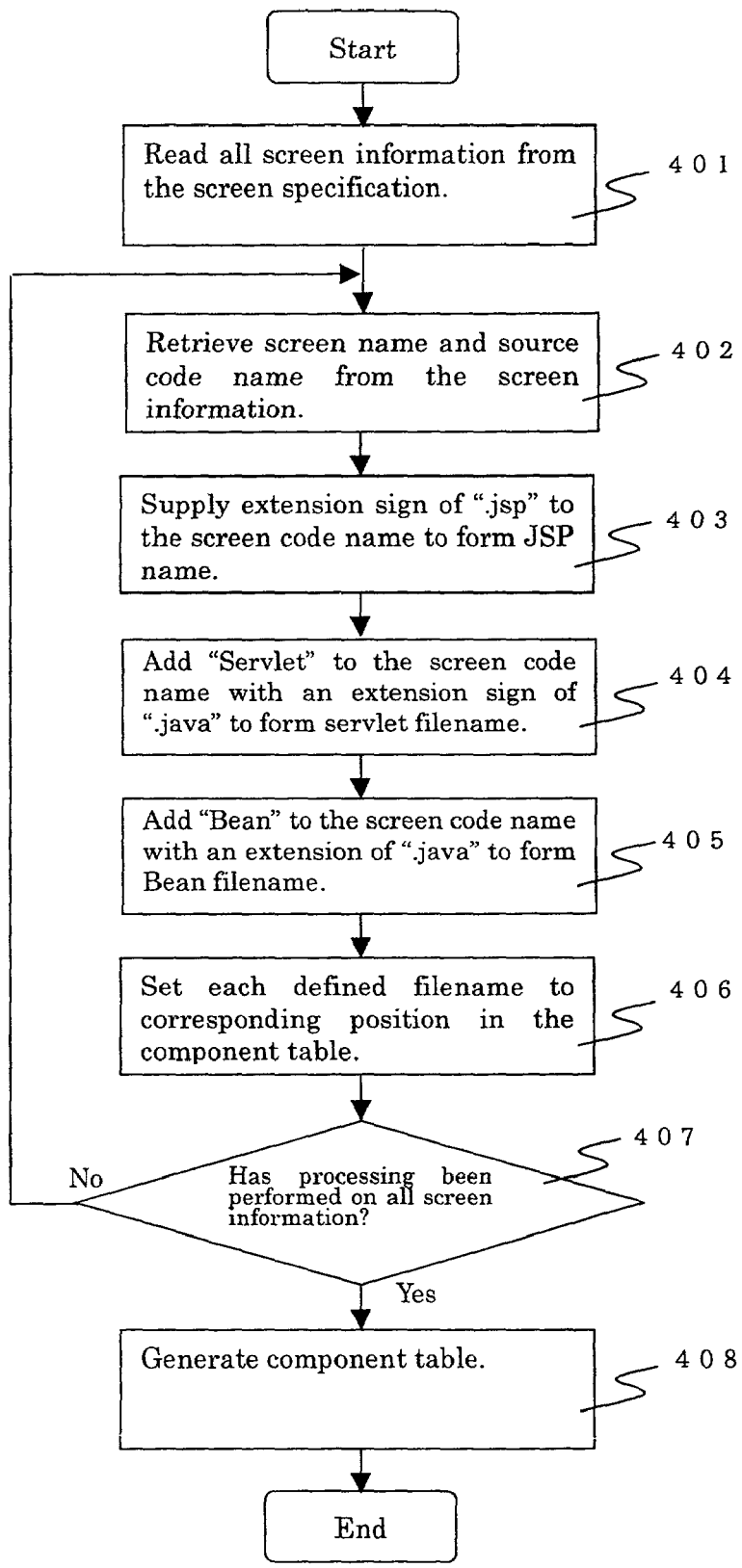
FIG. 4 is a view depicting an example of a flowchart for generating a component table.

Now, referring to FIG. 4, a process flow is explained for generating the component table 101 in the component table generating unit 205. First, all pieces of screen information are read from the GUI specification stored in the design document 204 (step 401). The screen name and screen code name are retrieved from the screen information (step 402). For example, the screen code name can be retrieved from the filename of HTML files created as each screen image or may be defined as the screen information. Alternatively, the screen code name can be inputted for each screen from the terminal 201. Here, an explanation is given assuming that the screen name retrieved is "New order screen" and the screen code name is "Order". Now, the retrieved screen code name is supplied with an extension sign of ".jsp" to form a JSP name (step 403). The screen code name is added by "Servlet" and supplied with an extension sign of ".java" to form a servlet filename (step 404). The screen code name is added by "Bean" and supplied with an extension sign of ".java" to form a Bean filename (step 405). Here, the filenames are defined as "Order.jsp", "OrderServlet.java", and "orderBean.java", respectively. The screen name and the filenames or the defined JSP name, servlet filename, and Bean filename are set to corresponding positions in the component table 101 (step 406). It is determined whether processing has been performed on all pieces of screen information retrieved in step 401 (step 407). If not, processing is repeated from step 402 to 406 until all pieces of information are processed. When all pieces of screen information have been processed, the component table 101 is finally generated and then control exits (step 408). The component table 101 generated in this step may be stored in the design document 204.

Figure 5:
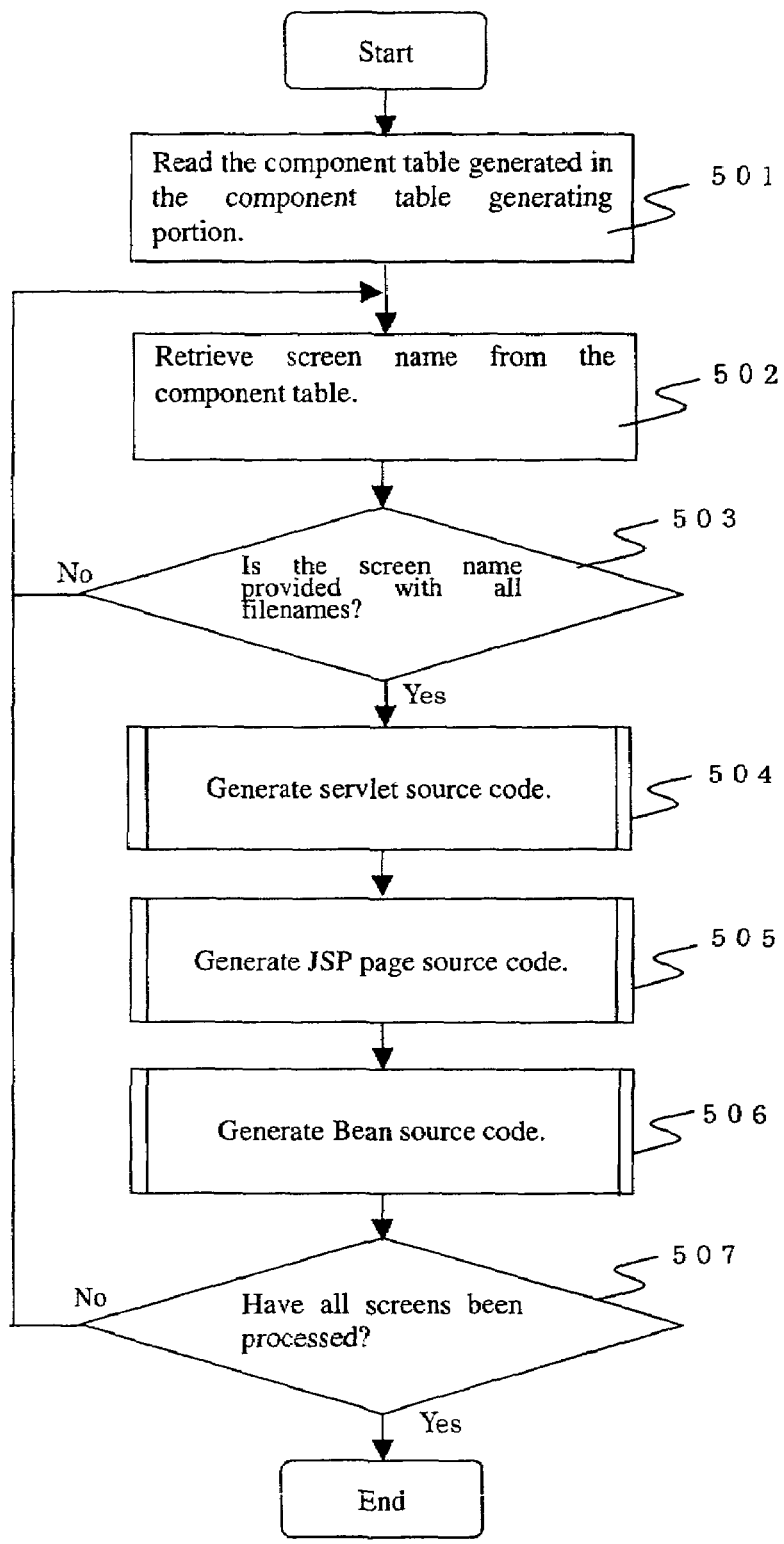
FIG. 5 is a view depicting an example of a flowchart for automatically generating a source code.

Now, referring to FIG. 5, a process flow is explained for automatically generating each source code of the servlet, JSP, and Bean in the automatic code generating unit 207. First, the component table 101 generated in the component table generating unit 205 is read (step 501). The screen name 102 is retrieved from the component table 101 (step 502). An explanation is given here assuming that the screen name retrieved is "New order screen". It is checked whether all of the JSP name 103, servlet filename 104, and Bean filename 105 have been set corresponding to the screen name retrieved (step 503). Take the "Error display screen" 106 in FIG. 1 as an example. Here, the screen name is provided only with the JSP name 103 of "Error.jsp" and thus control returns from step 503 to 502. If all filenames have been provided, the following processing will be performed. A servlet source code of "OrderServlet.java" is generated for the "New order screen", which is retrieved in step 502 (step 504). Similarly, a JSP source code of "Order.jsp" is generated (step 505) and a Bean source code of "OrderBean.java" is then generated (step 506). It is determined whether processing has been performed on all screens of the component table 101 retrieved in step 501 (step 507). If not, processing is repeated from step 502 to 506 until all screens are processed. When all screens have been processed, then control exits.

Figure 6:
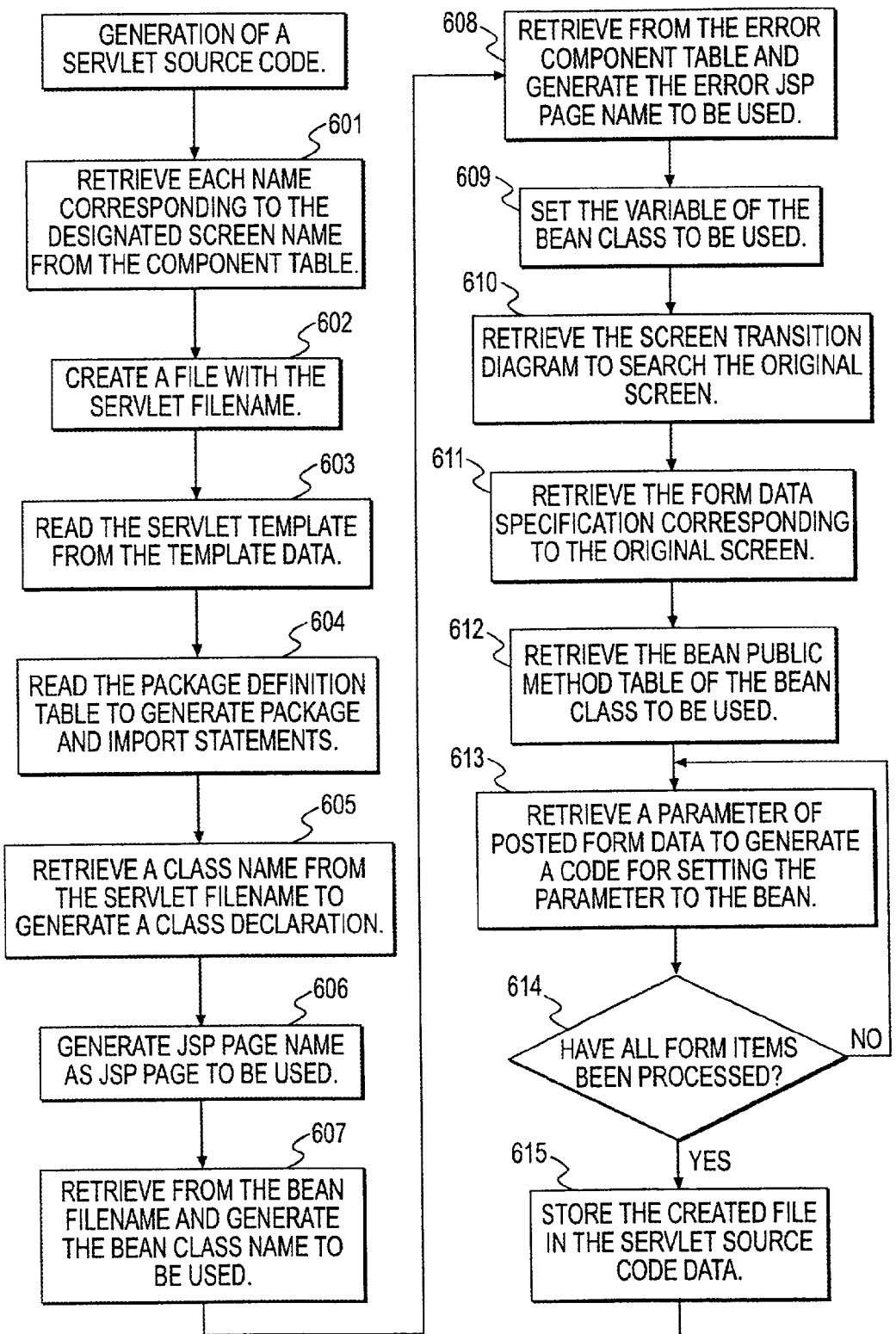
FIG. 6 is a view depicting an example of a flowchart for automatically generating a servlet source code.
Figure 7A:
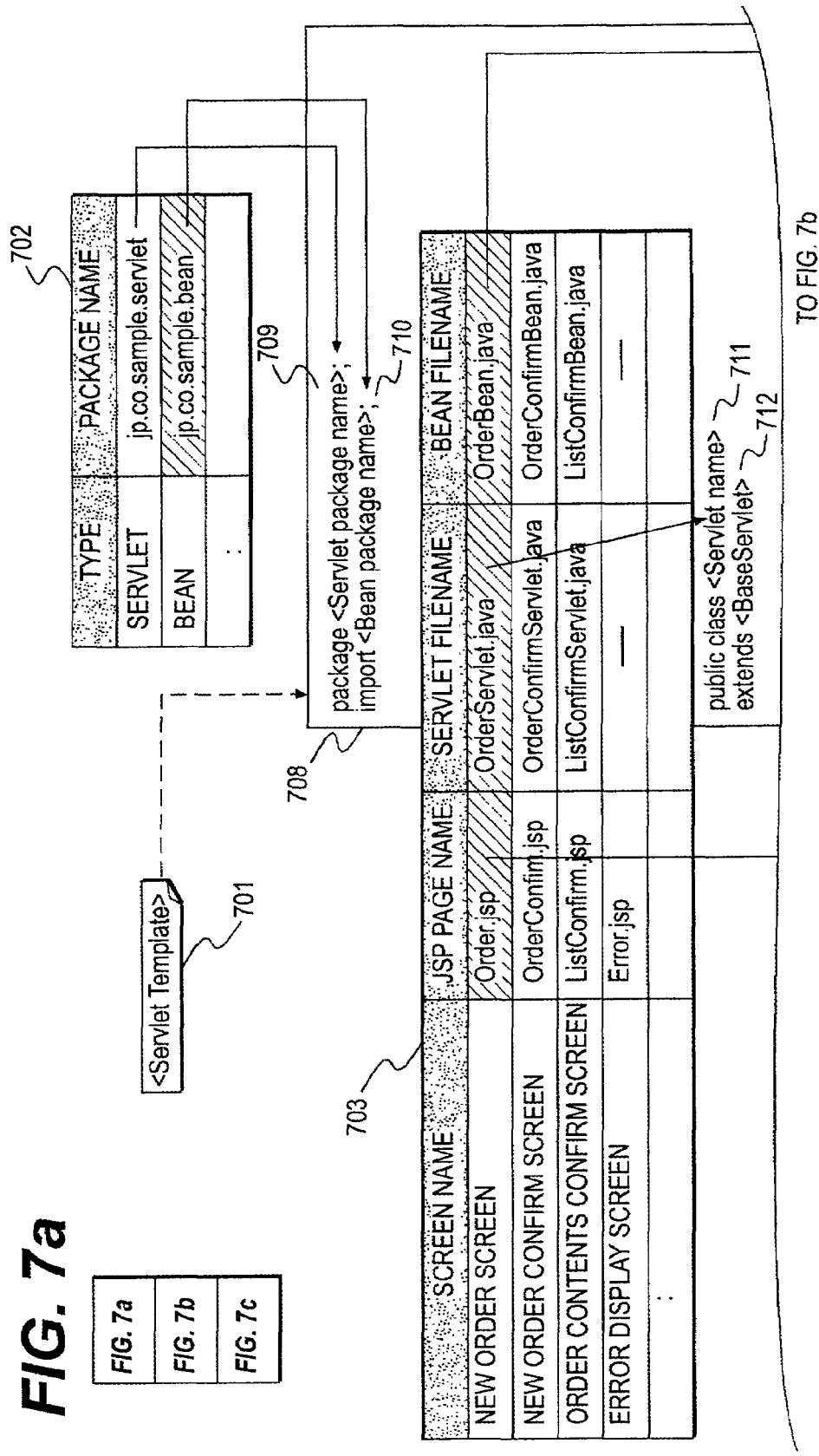
FIG. 7 is comprised of FIGS. 7a, 7b and 7c which are explanatory views depicting a flow for generating a servlet source code.
Figure 7B:
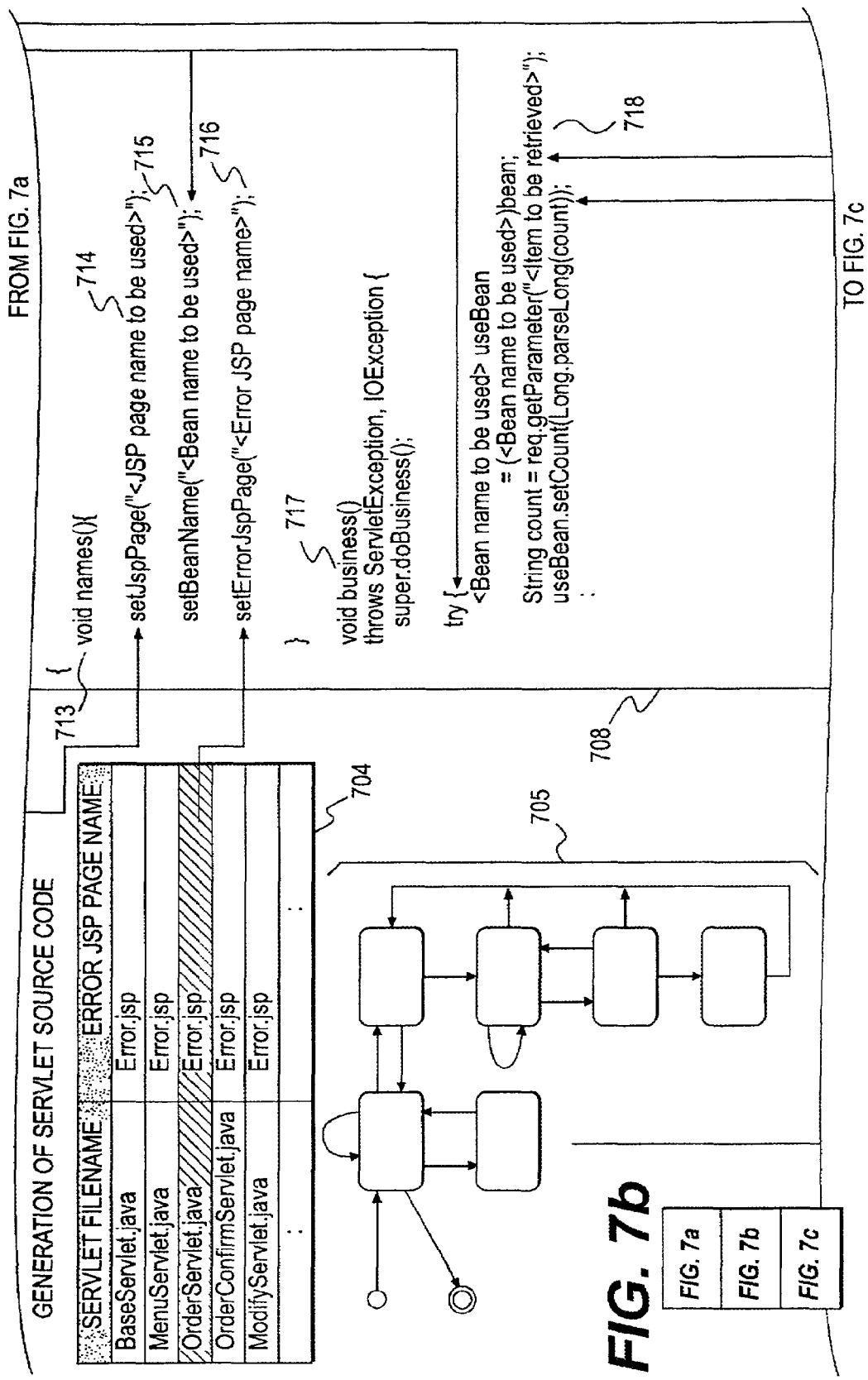
Figure 7C:
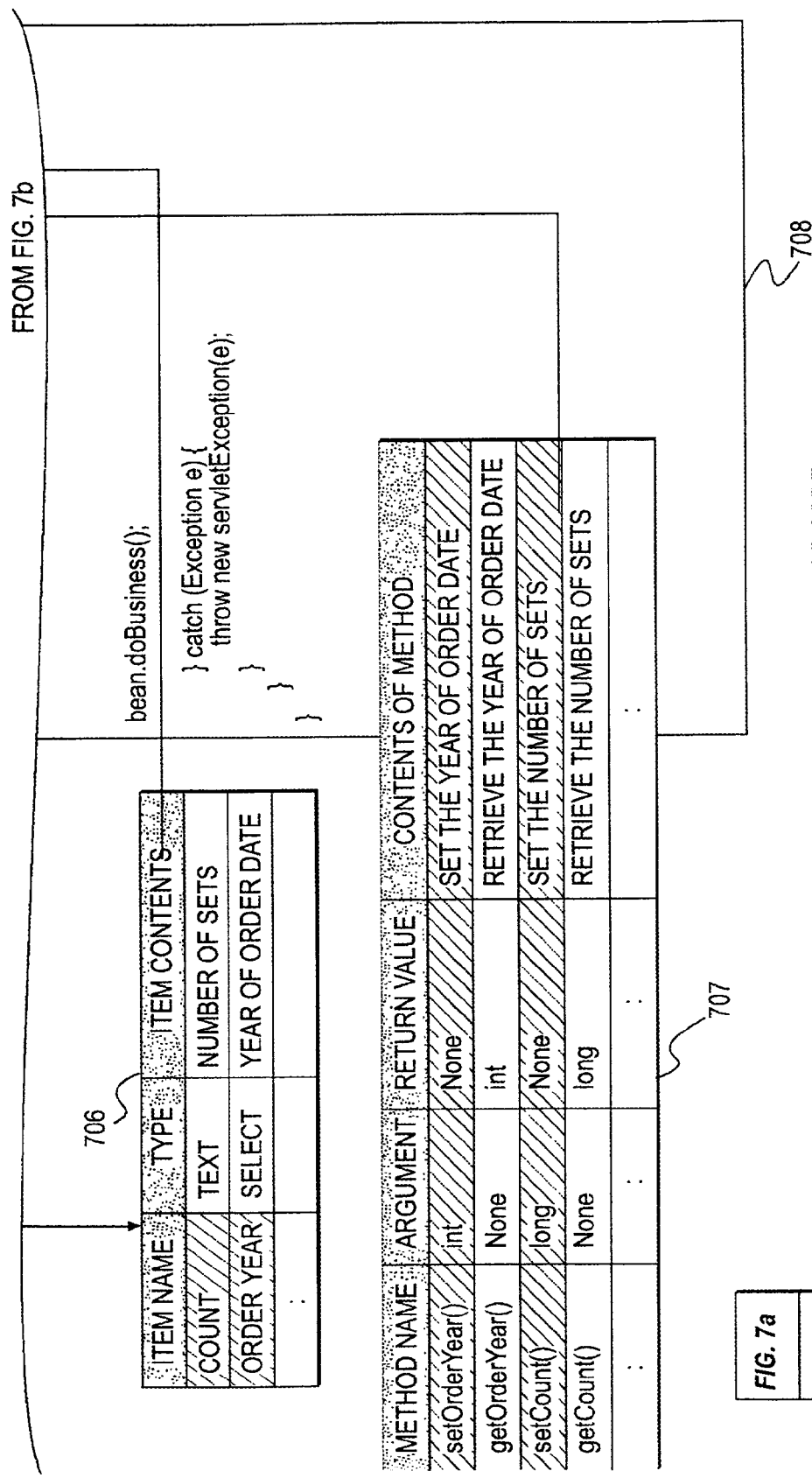

Now, referring to FIGS. 6 and 7, a process flow is explained for automatically generating a servlet source code for the designated screen name. Upon generation of a servlet source code, employed area servlet template 701, a package definition table 702, a component table 703, an error table 704, a form data specification 706, and a Bean public method table 707. Referring to FIG. 7, reference numeral 708 designates a servlet source code to be generated. First, each of the names corresponding to the designated screen name 102 is retrieved from the component table 101 (step 601). An explanation is given here assuming that the screen name 102 designated is "New order screen". "OrderServlet.java" of the servlet filename is employed as the filename of a source code 708 to create a file (step 602).

Then, the servlet template 701 is read from the template data 208 (step 603). The template 701 describes the basic frame of a servlet.

Then, the package definition table 702 is read from the design document 204 to generate a package statement 709 and an import statement 710 (step 604). A servlet package name is outputted to the package statement 709, while a Bean package name is outputted to the import statement 710.

The package declaration table 702 has the description of the package name of each component. "OrderServlet" is retrieved from "OrderServlet.java" of the servlet filename 104 as the class name to generate a class definition unit 711 (step 605). For example, "BaseServlet" 712 is generated as a superclass servlet that the "OrderServlet" inherits. The "BaseServlet" 712 is provided as a class to be used in the development support system according to this embodiment. For example, "names ( )" 713 and a "business ( )" 717 are a method defined by the "BaseServlet" 712 to be implemented in a subclass. The "names( )" 713 is a method for setting the name of JSP, Bean class, and an error JSP, which are employed by the servlet, while the "business ( )" 717 is a method for defining the contents of the processing performed by the servlet. "Order.jsp" of the JSP name 103 retrieved in step 601 is generated as a JSP 714 to be used (step 606), and "OrderBean" 715 of the Bean class name to be used is retrieved and outputted from the "OrderBean.java" of the Bean filename 105 (step 607). Then, the error table 704 is read from the design document 204 to retrieve and generate an error JSP 716 corresponding to the "OrderServlet.java" (step 608). The error table 704 associates each servlet file name 104 with each error JSP name, where a JSP is designated for displaying the error generated upon execution of the servlet.

Subsequently, the contents of the processing of the "business( )" 717 are generated. A variable is set using the Bean class name employed which has been retrieved in step 607 (step 609).

The "bean" is a variable defined in the superclass "BaseServlet" and is used by being cast to the Bean class used in the subclass. Then, the screen transition diagram 705 is read from the design document 204 to search the original screen by screen name (step 610), and then the form data specification 706 corresponding to the original screen is read from the design document 204 (step 611). When a request is sent from the Web browser 302 to the server 304, the information described in the form of the HTML page 303 is added to the request as input data. The input data is designated in the form data specification 706. The Bean public method table 707 of the Bean class to be used is read from the design document 204 (step 612), and then a parameter of posted form data is retrieved to generate a code 718 for setting the parameter to the Bean to be used (step 613). The Bean public method table 707 is a list of all methods that are made public in the Bean class to be used, and defines access methods for input data described in the form data specification 706. Then, it is checked whether the code 718 has been generated to set parameters to all items described in the form data specification 706 (step 614). If not, the processing of step 613 is repeated until all items are processed. When all items have been processed, control exits from the definition of the "business( )" 717. Finally, the created file of the source code 708 is stored in the servlet source code data 209 (step 615), and then control exits from the processing for automatically generating the servlet source code.

Referring to FIG. 7, it has been explained that the "BaseServlet" 712 is provided as a superclass. Now, referring to FIG. 8, the source code of the superclass "BaseServlet" 712 is explained below. In FIG. 8, reference numeral 801 designates a source code and "BaseServlet" 802 shows the class name of the superclass.

First, reference numeral 803 designates a declaration of variables, employed by the servlet, for declaring the JSP name, Bean class name, error JSP name, and a Bean object to be used. Reference numerals 804 to 811 designating the definition of methods are shown below. Methods "init( )"

807 and "doPost( )" 809 are defined by "HttpServlet" and implemented in this class. Method "business( )" 804 is overridden in the subclass and describes actual processing. Method "attribute( )" 805 performs setting to allow JSP to access Bean, while method "forward( )" 806 calls JSP from the servlet. Method "doPost( )" 809 determines the order of processing of the methods from 804 to 806 in order to allow the subclass not to take the order of processing into consideration. This obviates the necessity for a developer, who is to create the subclass, to have special knowledge on the servlet. In addition, the "init( )" 807 calls "names( )" 808. The "names( )" 808 is defined as an abstract method and implemented in the subclass. Referring back to FIG. 7, as shown by 714 to 716, the JSP to be used in the servlet and the Bean class are set. It is made possible to create a servlet which can be executed only by setting each name with the "names( )" 808. Method "error( )" 810 defines processing to be performed on an error occurring upon execution of the servlet. Access methods are defined below for the variables declared in the variable declaration 803.

Figure 10B:
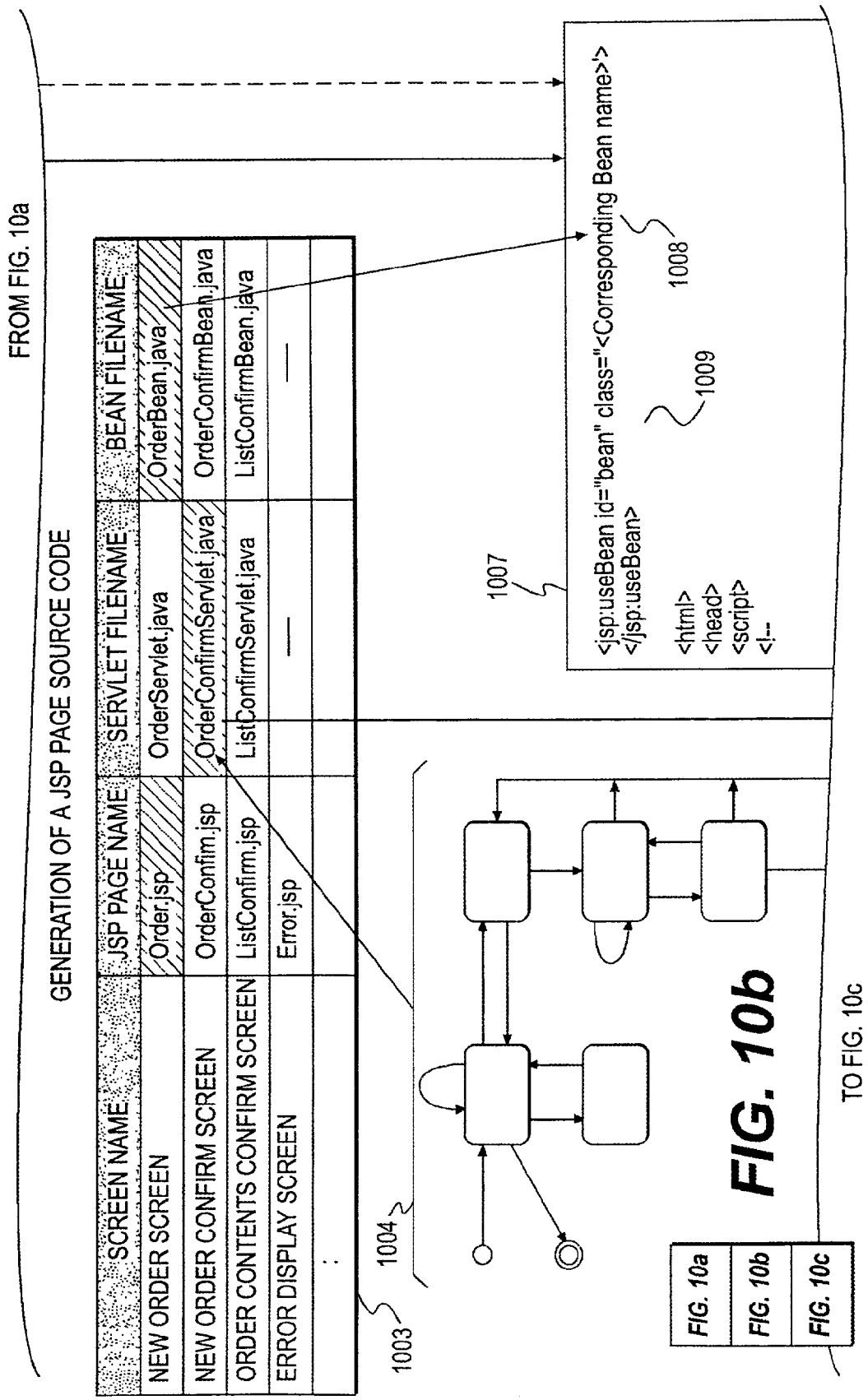
FIG. 10 is comprised of FIGS. 10a, 10b and 10c which are explanatory views depicting a flow for generating a JSP source code.
Figure 10C:
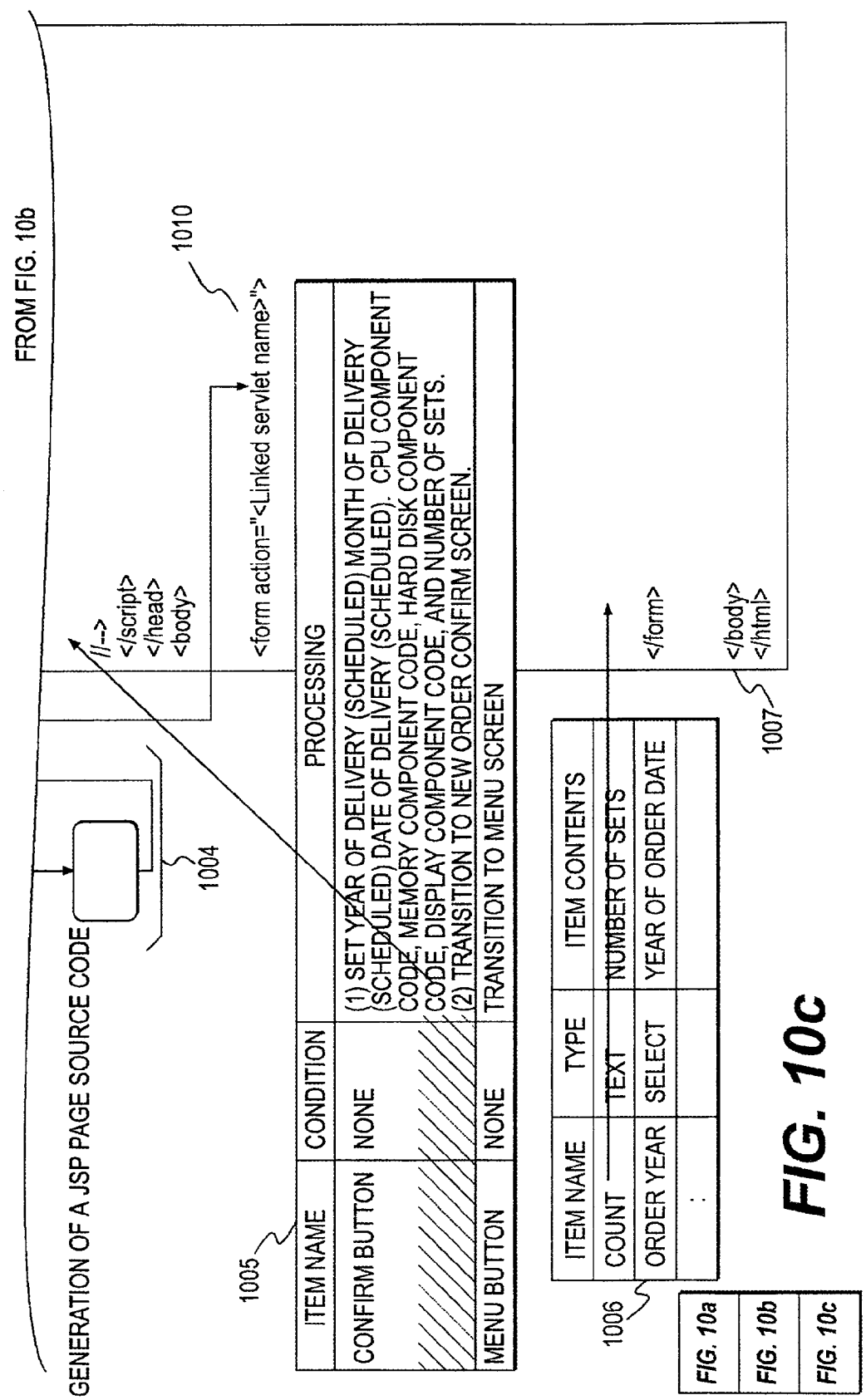
Figure 12A:
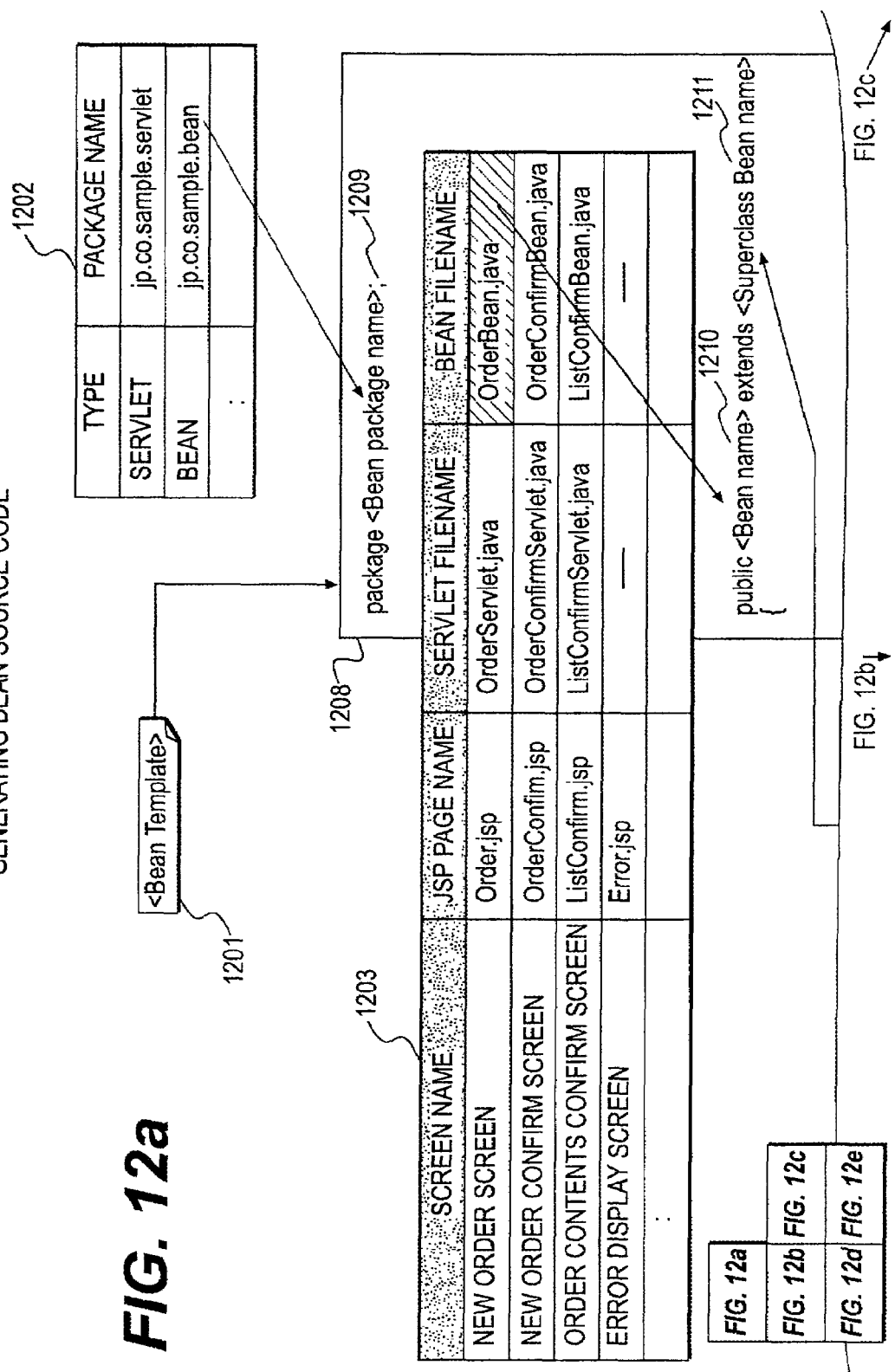
FIG. 12 is comprised of FIGS. 12a, 12b and 12c, which are explanatory views depicting a flow for generating a Bean source code.
Figure 12C:
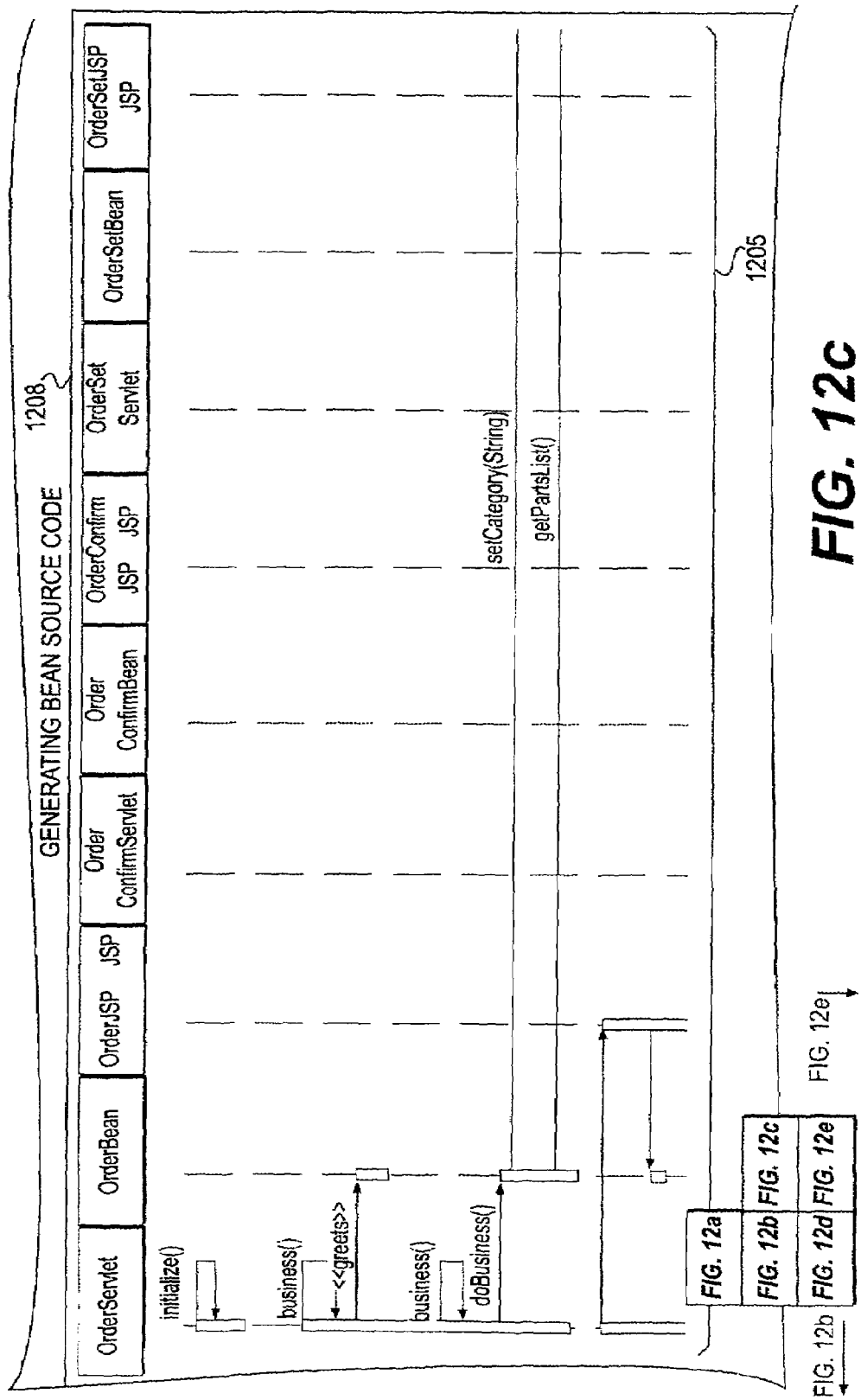
Figure 12D:
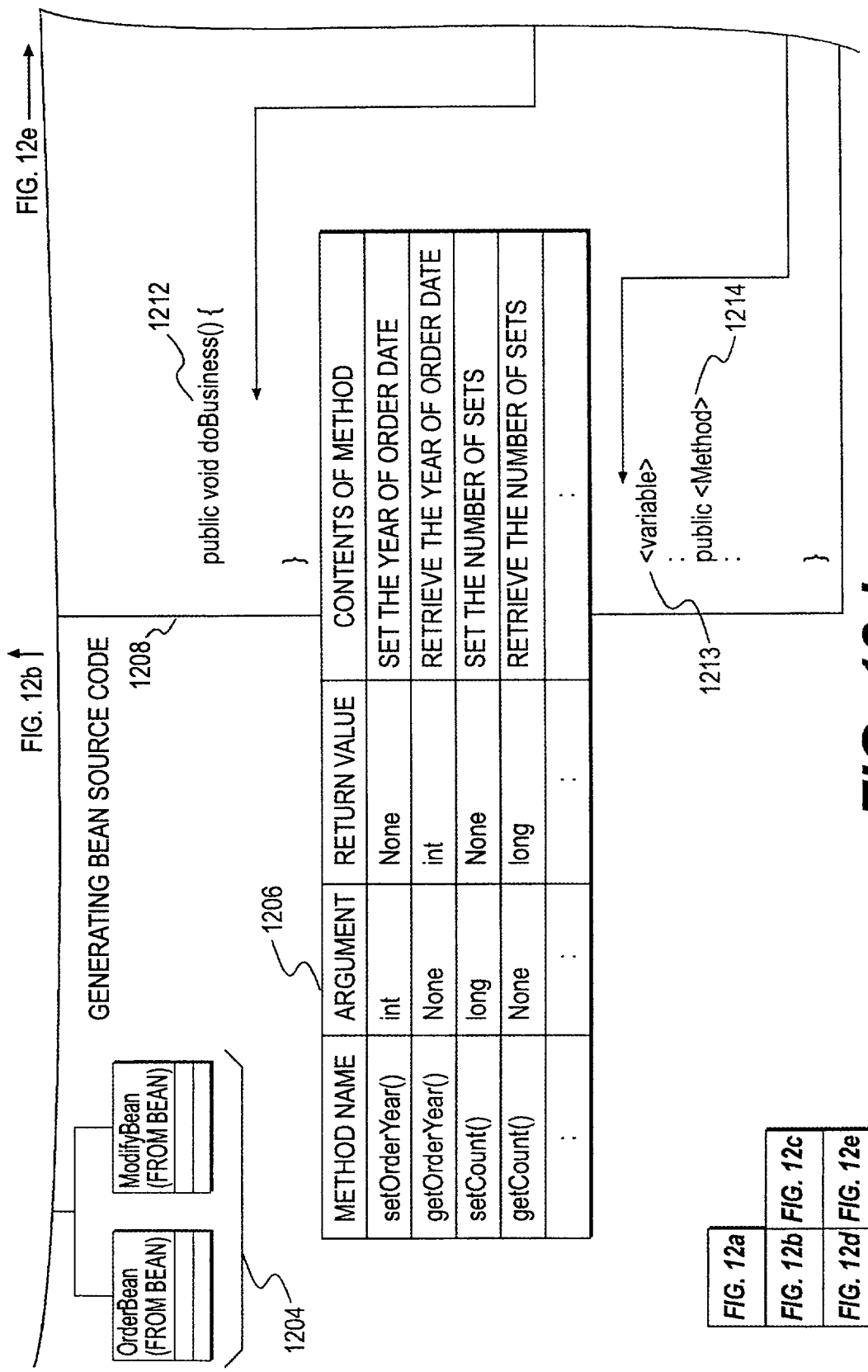
Figure 12E:
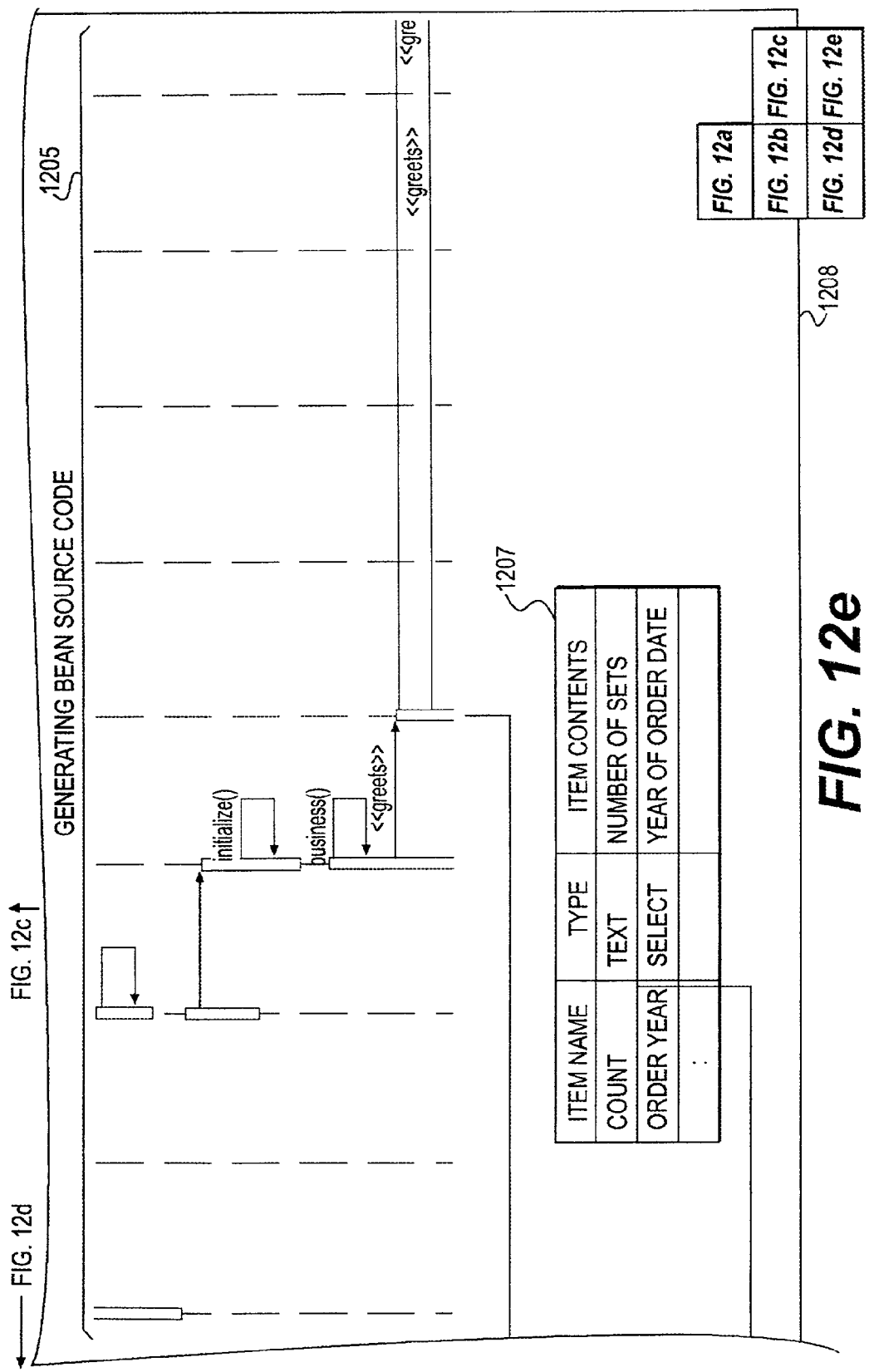

Now, referring to FIGS. 9 and 10, a process flow is explained for automatically generating a JSP source code for the designated screen name. Upon generation of a JSP source code, employed are a JSP template 1001, a screen image 1002, a component table 1003, a form data specification 1005, and an event specification 1006. Referring to FIG. 10, reference numeral 1007 designates a JSP source code to be generated.

First, each of the names associated with the designated screen name 102 is retrieved from the component table 101 (step 901). An explanation is given here assuming that the screen name 102 designated is "New order screen". The JSP filename "Order.jsp" is employed as the filename of the source code 1007 to create a file (step 902). Then, the JSP template 1001 is read from the template data 208 (step 903). The template 1001 describes the basic frame of JSP.

Then, the Bean class name 1008 "OrderBean" is retrieved from the Bean filename 105 "OrderBean.java" retrieved in step 901 and generated (step 904). A JSP syntax <jsp:useBean> 1009 is to use the Bean 308 in the JSP 309. A screen transition diagram 1004 is read from the design document 204 to search a linked screen (step 905), and then "OrderConfirmServlet" is set to a linked servlet 1010 based on the servlet filename 104 "OrderConfirmServlet.java" of the linked screen (step 906). Then, the event specification 1005 and the form data specification 1006 are read from the design document 204 (step 907), and an HTML file of the screen image 1002 is read (step 908). The event specification 1005 describes the contents of the processing performed upon pushing buttons or selection of lists in conjunction with input check conditions. A linked servlet 1010 determined in step 906, and the contents of the event specification 1005 and form data specification 1006 upon which the contents of the HTML file read in step 908 are reflected are generated (step 909). Finally, the created file of the source code 1007 is stored in the JSP source code data 210 (step 910), and then control exits from the processing for automatically generating the JSP source code.

Now, referring to FIGS. 11 and 12, a process flow is explained for automatically generating a Bean source code for the designated screen name. Upon generation of a Bean source code, employed are a Bean template 1201, a package definition table 1202, a component table 1203, a class diagram 1204, a sequence diagram 1205, a Bean public method table 1206, and a form data stement 709 and an import statemo FIG. 12, reference numeral 1208 designates a Bean source code to be generated.

First, each of the names associated with the designated screen name 102 is retrieved from the component table 101 (step 1101). An explanation is given here assuming that the screen name 102 designated is "New order screen". The Bean filename "OrderBean.java" is employed as the filename of the source code 1208 to create a file (step 1102). Then, the Bean template 1201 is read from the template data 208 (step 1103). The template 1201 describes the basic frame of Bean.

Then, the package definition table 1202 is read from the design document 204 to generate a package statement 1209 (step 1104). The Bean package name is generated in the package statement 1209. A class name "OrderBean" is retrieved from the Bean filename 105 "OrderBean.java" to generate a class definition unit 1210 (step 1105) The class diagram 1204 is read from the design document 204 to search the superclass Bean which the "OrderBean" inherits, and then generate the class name 1211 thereof (step 1106). Then, defined are the contents of the processing of "doBusiness( )" 1212 which is a method executed by a servlet. The sequence diagram 1205 is read from the design document 204 to define in accordance with the sequence diagram 1205 and generate the "doBusiness( )" 1212 (step 1107). The class diagram 1204 and the sequence diagram 1205 are a document which is described in UML (Unified Modeling Language) notation.

Then, the form data specification 1207 and the Bean public method table 1206 are read from the design document 204 (step 1108), and variable declarations 1213 are generated for all items described in the form data specification 1207 (step 1109) to define and generate all methods of the Bean public method table 1206 (step 1110). Finally, the created file of the source code 1208 is stored in the Bean source code data 211 (step 1112), and then control exits from the processing for automatically generating the Bean source code.

Figure 13:
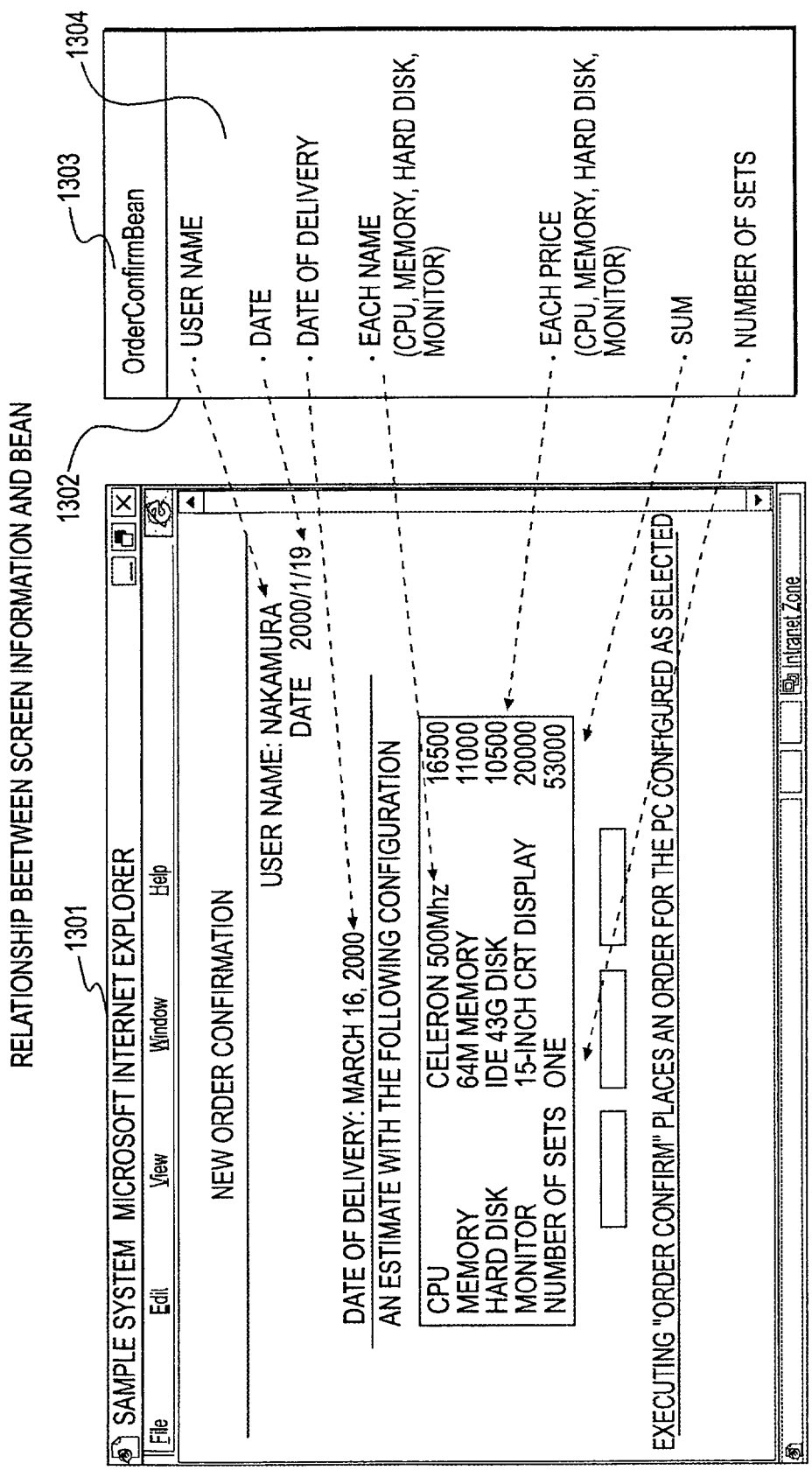
FIG. 13 is a view depicting the relationship between screen information and Bean.

Referring to FIG. 13, it will be explained that the Bean is a component that is provided with all pieces of information necessary for screen display. FIG. 13 is a view depicting the relationship between the screen information and Bean. In FIG. 13, reference numeral 1301 designates a screen image and an explanation is given to an example of "New order confirm screen". Reference numeral 1302 designates the class of Bean. The name displayed in a partition 1303 above the class 1302 is a class name, showing that the "OrderConfirmBean" corresponding to the "New order confirm screen" is the class name of the Bean. A lower partition 1304 indicates the attribute of the class. The "OrderConfirmBean" is provided with all pieces of information necessary to display the "New order confirm screen", the information being retrieved by JSP and displayed as an HTML page. The information which is necessary for screen display and inputted to the form is defined in the form data specification 1207 and the Bean public method table 1206 of FIG. 12.

Now, a second embodiment of the present invention is explained below. Here, an example is explained which employs a servlet, JSP, and Bean, described later with reference to FIG. 14, for designing and developing a Web application system. In particular, the present invention is characterized in that the name of each component of the servlet, JSP, and Bean is defined by being associated with each screen in the screen specification provided by design information. Using the component definition and the contents of the design information, the definition of methods and the call relationship between the components are automatically extracted to automatically generate source codes.

FIG. 14 is a view depicting an example of the overall configuration of a Web application system which employs the servlet, JSP, and Bean, designed and developed in this embodiment. This Web application system is used by a Web browser 1402 on a client 1401. A HTML page 1403 appears on the Web browser 1402. A request from the Web browser 1402 is sent to a server 1404 via HTTP. The server 1404 is provided with a HTTP server 1405 and an application server 1406, while the application server 1406 includes a runtime environment of a servlet and JSP.

A servlet 1407, JSP 1408, and Bean 1409 are arranged on the application server 1406 of the server 1404. A request sent from the Web browser 1402 of the client 1401 will cause the corresponding servlet 1407 to be activated in accordance with the request. The servlet 1407 issues a request to the corresponding Bean 1409 to perform processing. In addition, the Bean 1409 uses a business class and DB access class 1410 to access a database 1411, then performing data manipulation necessary for business transactions to execute business transactions and data processing. The Bean 1409 holds the resulting data. The business class and the DB access class 1410 represent a class created through the analysis and design of business rules or a reusable existing class. Then, the servlet 1407 passes the Bean 1409 to the JSP 1408, calls the JSP 1408, and issues a request thereto to generate an HTML page. The JSP 1408 retrieves the resulting data held in the Bean 1409 to generate an HTML page and send it back to the client 1401. The HTML page 1403, which has been sent back, is displayed on the Web browser 1402.

As described above, the servlet 1407 receives the request from the Web browser 1402, issues a request to the Bean 1409, and calls the JSP 1408, thus serving to connect between and control each of them. The JSP 1408 serves to display the output of an HTML page, while the Bean 1409 serves to assemble business using the business class and the DB access class 1410, execute actual processing, and hold the resulting data. Their respective roles are clearly separated, thereby allowing each of their functions to be grasped in a simple manner.

FIG. 15 depicts the relationship between some recipient components and response components, employed in a Web application system according to this embodiment. An input screen 1510 shows a screen for sending a request to the server 1404. The request is processed on the server and the resulting data is sent back to the client 1401 as an output screen 1504. In FIG. 14, the servlet 1407 corresponds to a recipient component 1502, while the JSP 1408 corresponds to a response component 1503. FIG. 14 shows the configuration of a Web application system employing the servlet, JSP, and Bean. It is also possible to receive a request from the Web browser 1402 and send back the resulting data thereto only with the servlet 1407 or only with the JSP 1408, without using the JSP 1408 and the Bean 1409. Preparation of recipient window parts 1 (1505) and response window parts 1 (1506) allows the received request to be assigned to a corresponding recipient part or the resulting data to be assigned to a corresponding response part. Accordingly, recipient components and response components are not always associated with each other in a one-to-one relationship. Components should be defined by selecting an appropriate relationship in accordance with the configuration of the Web application system to be developed. Here, an explanation is given to such a case where a recipient component and response component are associated with each other in a one-to-one relationship such as a recipient part 7 (1507) and response part 7 (1508).

FIGS. 16 and 17 show examples of defining a one-to-one relationship between the recipient component 1502 and the response component 1503. An event 1601 shows, for example, the pushing a button upon sending a request from the input screen 1501 to the server. A condition 162 is applied to the call made by the recipient component 1502 to the response component 1503 as a result of processing on the server. As an exception, when the condition 162 is set, the recipient component 1502 and the response component 1503 are associated with each other in a one-to-one relationship.

In FIG. 16, the recipient component 1502 for receiving a request from the input screen 1501 depends on the output screen 1504. The recipient component 1502 and the response component 1503 are created corresponding to the output screen 1504, considering that the request from the input screen 1501 is to output the subsequent output screen 1504. A screen C 1603 of the input screen 1501 includes a recipient component 1502 for sending a request, which is different depending on the event 1601.

On the other hand, in FIG. 17, the recipient component 1502 depend on the input screen 1501. The request from the input screen 1501 is received by the corresponding recipient component 1502. The recipient component 1502 assigns the response component 1503 in accordance with the event 1601 and condition 162. The recipient component 1502 and the response component 1503 are created corresponding to the input screen 1501 and the output screen 1504, respectively. A plurality of events 1601, such as on a screen C 1701 of the input screen 1501, will be received and processed by a corresponding recipient component 1502. Given below is an explanation of the definition of the relationship between components shown in FIG. 16.

FIG. 18 depicts an example of the definition, expressed in a tabular form, of the relationship among the screen name, servlet, JSP, and Bean of the Web application system which is designed and developed in this embodiment. A component definition table 1801 consists of a screen name 1802, a screen ID 1803, a servlet name 1804, a Bean name 1805, and a JSP name 1806, and defines names corresponding to each screen image. The screen name 1802 represents the name of a screen to be generated by a component with a combination of the servlet name 1804, the Bean name 1805, and the JSP name 1806. A servlet given by the servlet name 1804 is the recipient component 1502, while a JSP given by the JSP name 1806 is the response component 1503.

A Bean given by the Bean name 1805 is a component which executes the processing requested by the servlet and of which information is retrieved by the JSP upon generation of an HTML page.

The servlet name 1804 and the Bean name 1805 are not supplied with an extension sign and the name of a class file, whereas the JSP name 1806 is supplied with an extension sign of ".jsp". For example, for the screen name 1802 "Top" 1807, the servlet name 1804 is "DefaultServlet" in which the screen ID 1803 "default" with the first character being written with its upper-case letter is added by "Servlet". Similarly, the Bean name 1805 is "DefaultBean" in which the screen ID 1803 "default" with the first character being written with its upper-case letter is added by "Bean". The JSP name 1806 is "default.jsp" in which the screen ID 1803 is supplied with an extension sign of ".jsp".

In some cases, the servlet name 1804 and the Bean name 1805, or the JSP name 1806 and the Bean name 1805 are associated with each other in an n-to-m relationship such as "Order confirm" 1809. In this case, the Bean name 1805 cannot be defined on the screen ID 1803, and therefore edited for addition. Furthermore, for "Error display" 1810, only "error.jsp" 1811 of the JSP name 1806 is defined. This is called by some servlets.

Given below is an explanation of a one-to-one relationship among the servlet name 1804, the Bean name 1805, and the JSP name 1806.

A component definition table 1901 depicted in FIG. 19 shows an example of the definition of a one-to-one relationship among the servlet name 1804, the Bean name 1805, and the JSP name 1806, corresponding to each screen name 1802.

FIG. 20 depicts an example of the configuration of a system for designing and developing a Web application system. In FIG. 20, reference numeral 2001 designates a terminal for the input of commands and operation with a mouse; reference numeral 2002 designates a central processing unit for implementing various functionality, described later; and reference numeral 2003 designates an external storage unit for storing various pieces of information. A design document 2004 stored in the external storage unit 2003 includes a design document such as GUI specifications to be obtained from the requirements and business specification provided by customers for the development of a Web application system, and HTML files representative of screen design and each screen image. Component definition data 2005 include the component definition table 1901 depicted in FIG. 19. Template data 2006 include templates employed upon generation of the source code of each component, source codes or superclasses of servlet and Bean, and class files. Source code data 2007 include the source codes of the servlet, JSP, and Bean.

The central processing unit 2002 includes and executes software which implements the following three functions. A component definition generating/editing unit 2008 reads design information from the GUI specification stored in design document 2004 to generate and store in the component definition data 2005 the component definition table 1901 for defining the relationship among the screen, servlet, JSP, and Bean. Furthermore, it is possible to edit the generated component definition table 1901 on a terminal 2001 using the component definition generating/editing unit 2008. A code generating unit 2009 generates automatically the source code of each of the servlet, JSP, and Bean, using the component definition table 1901 stored in the component definition data 2005 and the design document 2004 such as the GUI specification or the system design document. Upon generation of source codes, used are the template and superclass of each of the components stored in the component definition data 2005. Each source code generated in the code generating unit 2009 is stored in the source code data 2007. Using the component definition table 1901 stored in the component definition data 2005, a code editing unit 2010 retrieves the source code of each component corresponding to the screen to be developed from the source code data 2007 to edit the source code on the terminal 2001 using an editor.

FIG. 21 depicts an example of a developing procedure for designing and developing a Web application system according to this embodiment. First, a servlet is created and then a Bean and a JSP are created in that order. In the creation of the servlet, a servlet source code 2108 is created using design information 2102 with reference to a servlet template 2101. For example, the design information 2102 necessary for creating the servlet includes the component definition table 1901, a package specification 2104, a screen transition diagram 2105, a form data specification 2106, a session management specification 2107, and an error specification 2108.

The package specification 2104 describes the definition and name of each component. The screen transition diagram 2105 shows the transition between screens. Upon sending a request from a Web browser to a server, the contents described in the form of an HTML page are added to the form data. The contents of the form data are described in the form data specification 2106. The session management specification 2107 describes the information that is taken over between the screens. The error specification 2108 describes the contents of the processing that is performed when an error has occurred as a result of processing on the server.

Subsequently, the Bean is created. Upon creation of the Bean, a Bean source code 2111 is created using design information 2110 with reference to a Bean template 2109. For example, the design information 2110 necessary for creating the Bean includes the component definition table 1901, the package specification 2104, the screen transition diagram 2105, the form data specification 2106, a check list 2112, a class specification 2113, a method specification 2114, and a sequence diagram 2115.

The check list 2112 describes items such as a value check or validity check of the form data provided when a request is sent. The class specification 2113 describes the Bean, a business class of FIG. 14, the class diagram of the DB access class 1410, and the outline, attribute and method of a class. The method specification 2114 describes in detail the method provided by the class of the class specification 2113. The sequence diagram 2115 shows in a diagram the flow of method processing. The class diagram of the class specification 2113 and the sequence diagram 2115 are a document which is described in UML (Unified Modeling Language) notation.

Finally, the JSP is created. Upon creation of the JSP, a JSP source code 2118 is created using design information 2117 with reference to a JSP template 2116. For example, the design information 2117 necessary for creating the JSP includes the component definition table 1901, a screen image 2119, the screen transition diagram 2105, an event specification 2120, the form data specification 2106, the class specification 2113, and the method specification 2114.

The screen image 2119 defines the image of each screen of the GUI specification and is created in an HTML file. The event specification 2120 describes the check items or processing on the client to check inputs such as pushing buttons or selection of lists in an HTML page form.

The system according to this embodiment allows the code generating unit 2009 to automatically generate each of source codes 2103, 2111, 2118 of the servlet, JSP, and Bean, which are in turn stored as the source code data 2007 in the external storage unit 2003. In addition, the code editing unit 2010 is used to edit the source codes.

The flow of processing for generating the component definition table 1901 with the component definition generating/editing unit 2008 is explained below with reference to FIG. 22. First, all pieces of screen information are read from the GUI specification stored in the design document 2004 (step 2201). The screen name and ID are retrieved from the first screen information (step 2202). For example, the screen ID may be retrieved from the filename of each HTML file prepared as a screen image or may be defined in the screen information. Alternatively, the screen ID may be entered on the terminal 2001 for each screen. Here, an explanation is given assuming that the retrieved screen name is "Order confirm" and the screen ID is "confirm".

Then, the retrieved screen ID with the first character being written with its upper-case, letter is added by "Servlet" to form a servlet name (step 2203). Similarly, the screen ID with the first character being written with its upper-case letter is added by "Bean" to form a Bean name (step 2204). The screen ID is supplied with an extension sign of ".jsp" to form a JSP filename (step 2205). Thus, the name of each of the components is defined as "ConfirmServlet", "ConfirmBean", and "confirm.jsp", respectively. A set of the screen name, the screen ID, and the defined servlet name, Bean name, and JSP name is added to the component definition table 1901 (step 2206).

Then, it is checked whether all pieces of screen information retrieved in step 2201 have been processed (step 2207). If not, control returns so as to repeat the processing from step 2202 to 2206 until all screen information has been processed. Finally, if all pieces of screen information have been processed, the component definition table 1901 is stored in the component definition data 2005 and then control exits (step 2208). Here, the generated component definition table 1901 may be stored in the design document 2004.

Now, referring to FIG. 23, a process flow is explained for automatically generating each source code of the servlet, JSP, and Bean in the code generating unit 2009. First, the component definition table 1901 generated by the component definition generating/editing unit 2008 is read (step 2301). The screen name 1802 is retrieved from the component definition table 1901 (step 2302). An explanation is given here assuming that the screen name retrieved is "Order confirm". The name of each component corresponding to the screen name is retrieved (step 2303). It is checked whether all of the servlet name 1804, Bean name 1805, and JSP name 1806 have been set corresponding to the screen name retrieved (step 2304). Take the "Error display" 1811 in FIG. 19 as an example. Here, the screen name is provided only with the JSP name 1806 "error.jsp" and thus control returns from step 2304 to 2302. If all names have been set, the following processing will be performed.

First, a servlet source code of "ConfirmServlet.java" is generated for the "Order confirm", which is retrieved in step 2302 (step 2305). Similarly, a Bean source code of "ConfirmBean.java" is generated (step 2306) and a JSP source code of "confirm.jsp" is then generated (step 2307). It is determined whether processing has been performed on all screen names of the component definition table 1901 that has been read in step 2301 (step 2307). If not, processing is repeated from step 2302 to 2307 until all screen names have been processed. When all screen names have been processed, then control exits. Incidentally, in the foregoing, the source codes are generated after it is checked in step 2304 that all of the servlet name 1804, Bean name 1805, and JSP name 1806 have been set corresponding to the screen name. However, the check in step 2304 is not always inevitable. If any one of the servlet name 1804, Bean name 1805, and JSP name 1806 has been set, its source code may be generated.

Figure 24:
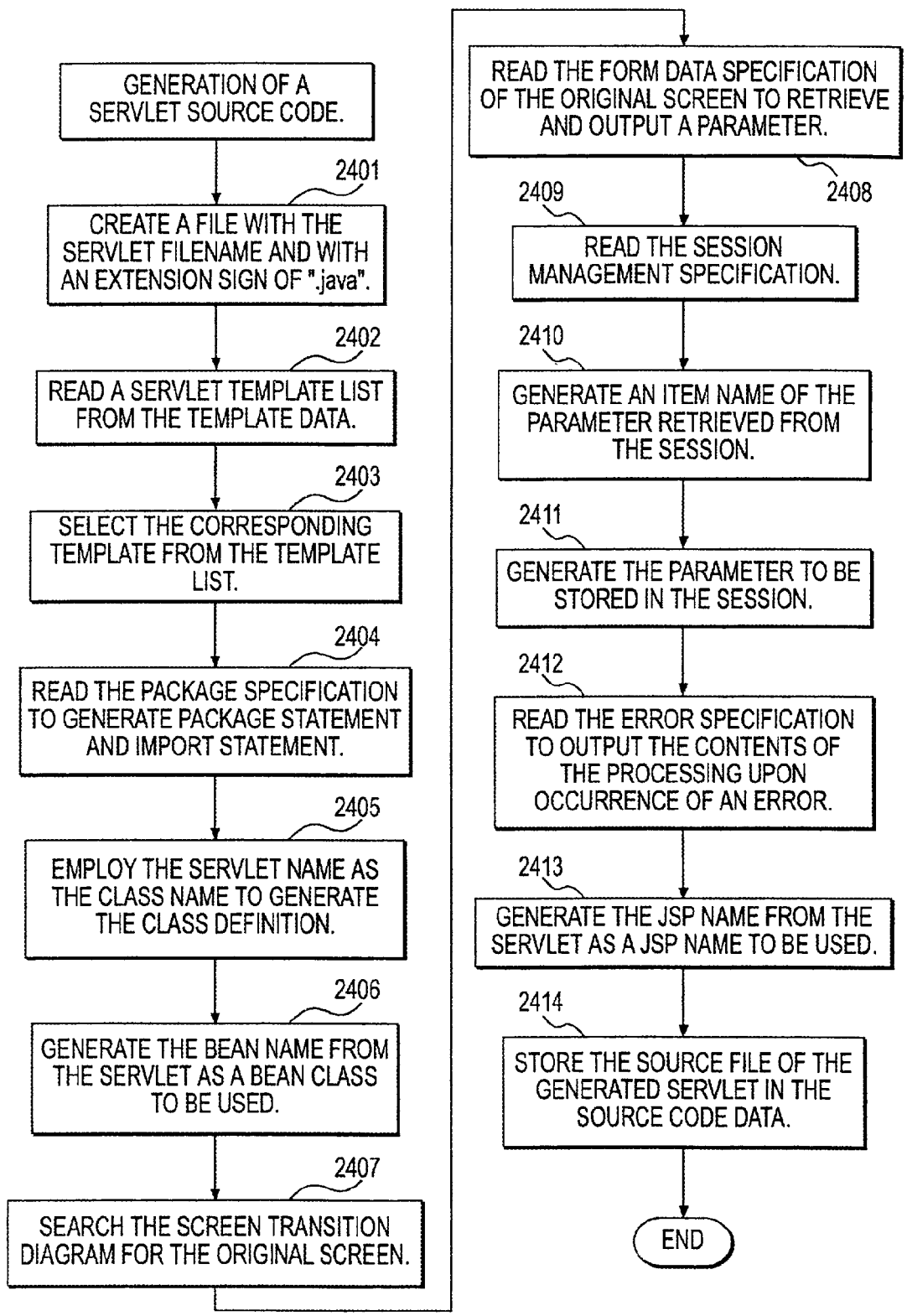
FIG. 24 is a flowchart depicting a flow for automatically generating a servlet source code.

Now, referring to FIGS. 24 and 25, a process flow is explained for automatically generating a servlet source code for the designated screen name in the code generating unit 2009. It is assumed that the name of each component defined in the component definition table 1901 is given in advance. An explanation is given here assuming that the screen name 1802 designated is "Order confirm" and the names of the components are "ConfirmServlet", "ConfirmBean", and "confirm.jsp", respectively. Upon generation of a servlet source code, employed are the servlet template 2101, the component definition table 1901 from the design document stored in the design document 2004, the package specification 2104, the screen transition diagram 2105, the form data specification 2106, the session management specification 2107, and the error specification 2108. Referring to FIG. 25, reference numeral 2501 designates a servlet source code to be generated.

First, created is a file "ConfirmServlet.java" with the filename of the given servlet name 1804 and with an extension sign of ".java" (step 2401). Then, a servlet template list is read from the template data 2006 (step 2402). The template data 2006 stores the basic frame of a servlet as well as servlet templates for various use and superclasses. Then, the template 2101 for use with the servlet to be created is selected from the template list that has been read (step 2403). The selected template 2101 is used as a model for creating the source code 2501. Here, in some cases, the employed template 2101 may be individually selected or may have already been set.

Then, the package specification 2104 is read to generate a package statement 2502 and an import statement 2503 (step 2404). The servlet package name is outputted to the package statement 2502, while the Bean package name is outputted to the import statement 2503. Then, the servlet name 1804 "ConfirmServlet" is employed as the class name and outputted to a class declaration 2504 (step 2405). A "service( )" 2505 is a method provided by the servlet API and would be executed in accordance with the request from a client. In the subsequent processing, the contents of the processing of the "service( )" 2505 are generated.

First, the given Bean name 1805 "ConfirmBean" is generated from the servlet and outputted as a Bean class name 2506 to be used (step 2406). The original screen is searched in the screen transition diagram 2105 (step 2407). Then, the form data specification 2106 of the original screen is read as an item name 2507 for use upon retrieval of a parameter, the parameter being then retrieved and set to the Bean (step 2408). Subsequently, the session management specification 2107 is read (step 2409) to generate an item name 2508 of the parameter retrieved from the session (step 2410).

Similarly, the parameter to be stored in the session and an item name 2510 are generated (step 2411). A method "doTask( )" 2509 is used to issue a request from the servlet to the Bean for processing. Then, the error specification 2108 is read to generate the contents of the processing upon occurrence of an error (step 2412). At the end of the "service( )" 2505, the given JSP name 1806 "confirm.jsp" is generated as a JSP name 2512 to be called from the servlet (step 2413). Finally, the file of the generated source code 2501 is stored in the source code data 2007, and then control exits from the processing for automatically generating the servlet source code (step 2414).

FIGS. 24 and 25 show examples for generating the servlet source code. In these examples, the template 2101 is employed as a model for automatically extracting and generating necessary items from the contents of the design document 2004 to output the items where appropriate. Now, referring to FIG. 26, it will be explained below that source codes can also be generated by inheriting as a template a superclass prepared as a class to be used in the development system according to this embodiment. In FIG. 26, reference numeral 2601 designates a servlet source code to be generated. Since most of common processing is defined in a superclass, only unimplemented or insufficient processing may be developed. In addition, the source code 2601 of FIG. 26 can be generated more easily than the source code 2501 of FIG. 25.

When a source code is created by inheriting a superclass, a superclass is selected in step 2403 of FIG. 24 for the template 2101 to be used. Then, the superclass is outputted to a superclass name 2602, which inherits the superclass, upon outputting the class declaration in step 2405. Most of processing is implemented in the superclass of the servlet, for example, methods "init( )" 2603, "beforeTask( )" 2604, and "afterTask( )" 2605 are only declared. These methods 2603, 2604, 2605 are defined in the subclass. The method "init( )" 2603 carries out setting upon initialization and designates the Bean name or JSP name, which are to be used or called by the servlet, using "setBeanName( )" 2606 or "setJspPage( )" 2607. Then, the contents of the processing to be performed before the Bean is requested for processing are implemented in the "beforeTask( )" 2604, whereas the contents of the processing to be performed after the Bean has performed processing are implemented in the "afterTask( )" 2605. For example, session management is carried out here. As described above, developers can develop a servlet only by implementing the "init( )" 2603, the "beforeTask( )" 2604, and the "afterTask( )" 2605.

In FIG. 26, it has been explained above that source codes can be generated by inheriting as a template a superclass prepared as a class to be used in the development system according to this embodiment. Now, referring to FIG. 27, an example of a superclass source code is explained below. In FIG. 27, reference numeral 2701 designates a superclass source code and a class name 2702 is "BaseServlet".

First, reference numeral 2703 is the declaration of a variable employed in the "BaseServlet", which declares the JSP name, the Bean name, and the Bean object to be used. Reference numerals 2704 to 2712 designate the definition of methods below. A method "init( )" 2704 carries out setting upon initialization and is implemented in the subclass to set the Bean name and JSP name, which are used or called by the servlet. A method "service( )" 2705 is provided by the servlet API and will be executed when required by a client. In the "service( )" 2705, the methods from 2707 to 2712 are executed in the predetermined order. For this reason, the subclass that inherits the superclass "BaseServlet" 2702 has no need to take the order of processing into consideration. This obviates the necessity for a developer, who is to create the subclass, to have special knowledge on the servlet. Definition of the "init( )" 2704 in the subclass would make it possible to create an executable servlet.

A method "create( )" 2706 creates an object with the designated Bean name, while a method "doTask( )" 2708 issues a request to the Bean for processing. The processing before and after the "doTask( )" 2708 is described in methods "beforeTask( )" 2707 and "afterTask( )" 2709, respectively, and is implemented in the subclass if necessary. A method "callJsp( )" 2710 calls the JSP of the JSP name designated. Occurrence of an exception while the "service( )" 2705 is being executed would cause a method "error( )" 2711 to execute error processing. Reference numeral 2712 is the definition of an access method for a variable 2703 employed in the "BaseServlet".

When a servlet source code is automatically generated in the code generating unit 2009, a template is selected corresponding to the servlet to be created. An example of a method for selecting the template is explained below with reference to FIG. 28. In FIG. 28, reference numeral 2801 designates an operation screen for a development support system according to this embodiment. In a region 2802 to the left of the screen, displayed is a system name of an "Order system" 2803 which is to be designed and developed. In a hierarchical structure provided just below the "Order system", a screen name "Order confirm" 2804 is displayed and followed by the servlet, JSP, and Bean in sequence. This hierarchical structure represents the contents of the component definition table 1901 that is defined by the component definition generating/editing unit 2008.

Here, an explanation is given to a case where a template is selected for use in generating "ConfirmServlet" 2805 of the servlet. Reference numeral 2806 designates a template selection screen for allowing a template of the servlet to be selected, where the template list read from the template data 2006 is displayed in list form. The list displayed includes a name 2807 indicating the template and a code name 2808. Selection of a template to execute an execution button 2809 on the template selection screen 2806 will make the selected template available. In addition, the execution of a contents explanation button 2810 would cause a screen 2811 to be displayed, in which the template selected is explained in detail.

Like the servlet, a template is selected and used as a model upon generation of Bean and JSP source codes, which is described with reference to FIGS. 30 and 33. Referring to FIG. 29, explained is an example of a method for selecting each of the Bean and JSP templates. Like the template selection screen 2806 of FIG. 28, there are provided a Bean template selection screen 2901 and a JSP template selection screen 2904. In the list displayed on each screen, displayed are template names 2902, 2905 and code names 2903, 2906. In the Bean template selection screen 2901, shown is the configuration of classes in a class hierarchy. In addition, in the JSP template selection screen 2904, a plurality of templates or a combination of templates can be used.

Figure 30:
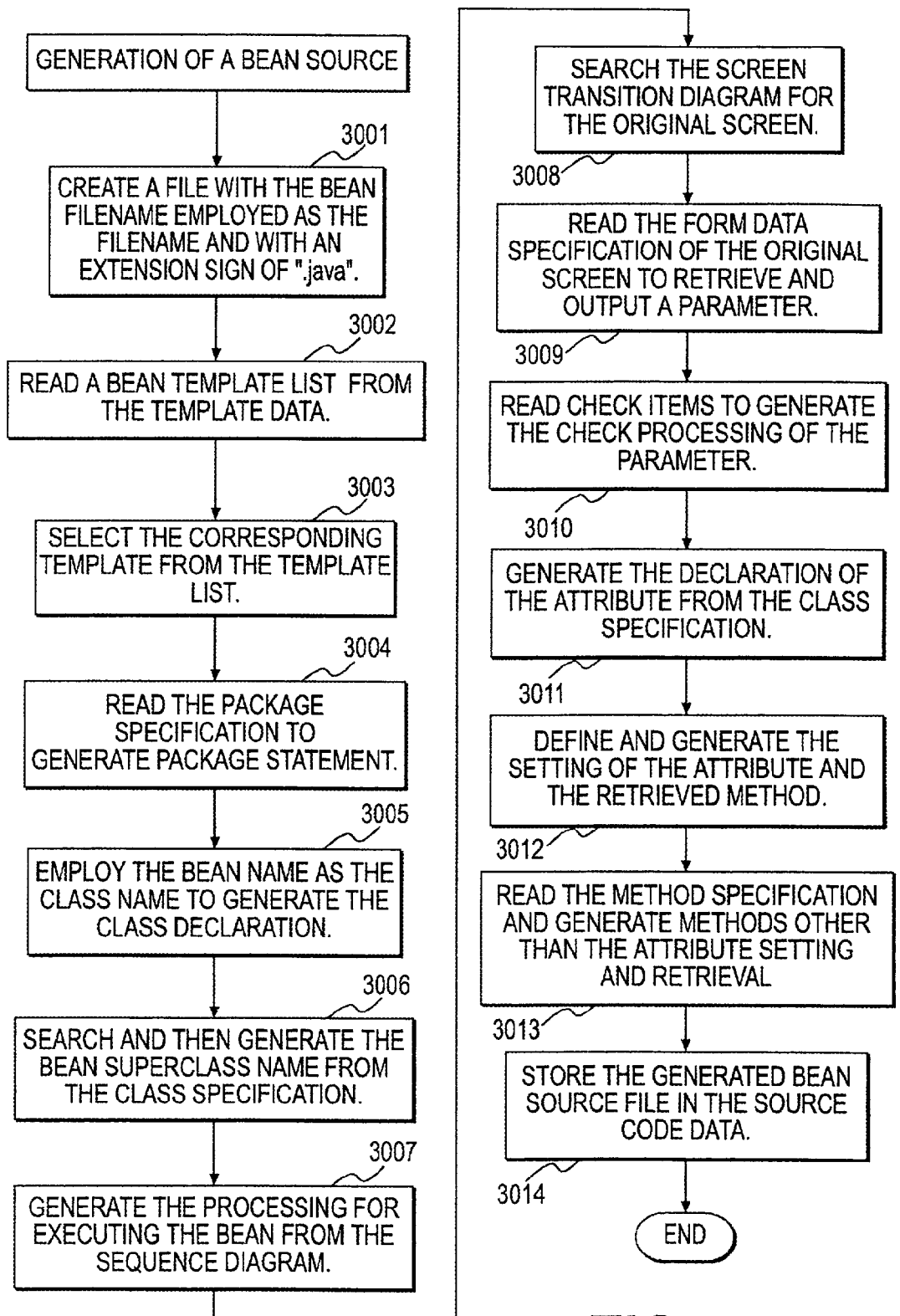
FIG. 30 is a flowchart depicting a flow for automatically generating a Bean source code.
Figure 31:
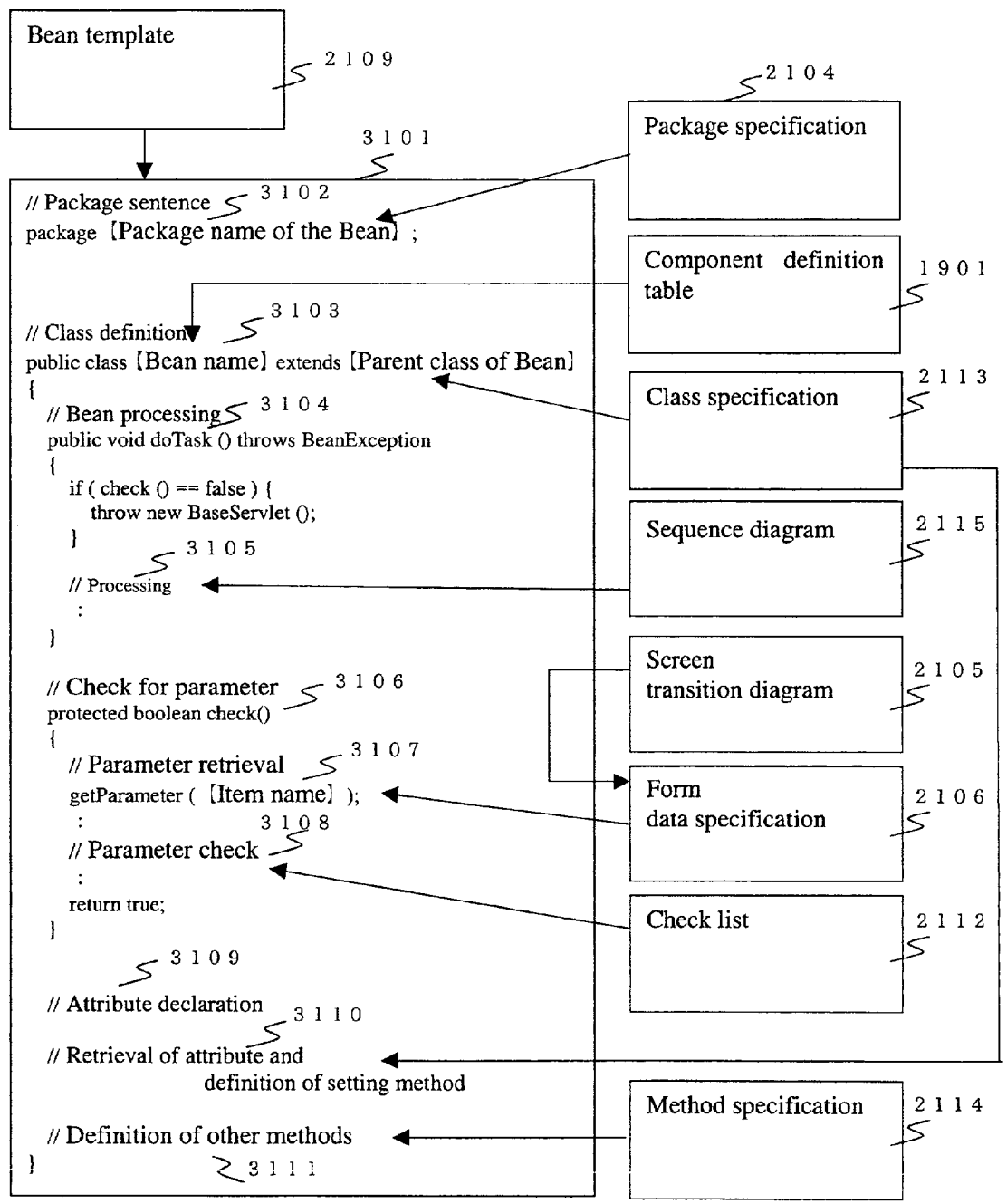
FIG. 31 is a view depicting an example of generating a Bean source code.

Now, referring to FIGS. 30 and 31, a process flow is explained for automatically generating a Bean source code for the designated screen name in the code generating unit 2009. It is assumed that the name of each component defined in the component definition table 1901 is given in advance. An explanation is given here assuming that the screen name 1802 designated is "Order confirm" and the name of the component is "ConfirmBean". Upon generation of a Bean source code, employed are the Bean template 2109, the component definition table 1901, the package specification 2104 from the design document stored in the design document 2004, the screen transition diagram 2105, the form data specification 2106, the check list 2112, the class specification 2113, the method specification 2114, and sequence diagram 2115. Referring to FIG. 31, reference numeral 3101 designates a Bean source code to be generated.

First, created is a file "ConfirmBean.java" with the filename of the given Bean name 1805 employed as the filename and with an extension sign of ".java" (step 3001). Then, a Bean template list is read from the template data 2006 (step 3002). Like the servlet template, the template data 2006 stores the basic frame of a Bean as well as Bean templates for various use and superclasses. Then, the template 2109 for use with the Bean to be created is selected from the template list that has been read (step 3003). The selected template 2109 is used as a model for creating the source code 3101.

Then, the package specification 2104 is read to generate the package statement 3102 (step 3004). The Bean package name is generated in the package statement 3102. Then, the Bean name 1805 "ConfirmBean" is employed as the class name and outputted to a class declaration 3103 (step 3005). Furthermore, the class specification 2113 is searched for the superclass of the target Bean class "ConfirmBean" to generate the name (step 3006).

A method "doTask( )" 3104 is executed by the servlet and the contents of the processing 3105 are implemented here with the Bean. Then, the sequence diagram 2115 is read to output the contents of the processing in accordance with the sequence diagram 2115 (step 3007). Then, the contents of the processing of a method "check( )" 3106 are generated. The "check( )" 3106 is called from the "doTask( )" 3104 to check the parameter passed from the servlet. First, the original screen is searched in the screen transition diagram 2105 (step 3008). Then, the form data specification 2106 of the original screen is read to generate an item name 3107 for use upon retrieval of a parameter (step 3009). The check list 2112 is read to generate check processing 3108 for checking the parameter generated in step 3009 (step 3010).

Then, the attribute of the target Bean class "ConfirmBean" is retrieved from the class specification 2113 to generate a declaration 3109 of the attribute (step 3011). Then, generated are a retrieval method for retrieving and a setting method 3110 for setting the attribute (step 3012). Furthermore, the method specification 2114 is read to generate methods other than the "doTask( )" 3104, the "check( )" 3106, the attribute setting method, and the attribute retrieval method 3110 (step 3013). Finally, the file of the generated source code 3101 is stored in the source code data 2007, and then control exits from the processing for automatically generating the Bean source code (step 3014).

Figure 32:
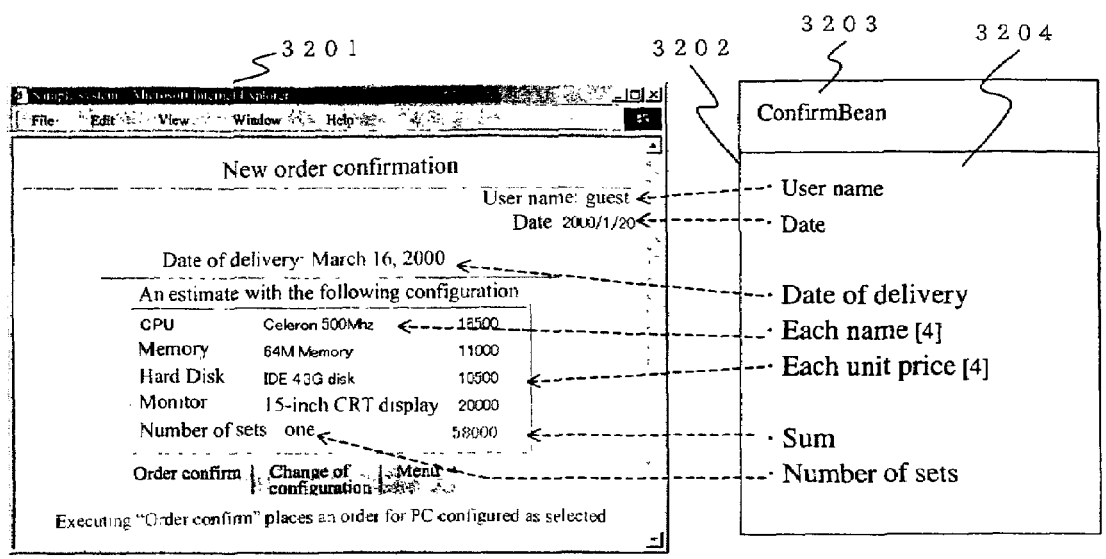
FIG. 32 is a view depicting the relationship between screen information and Bean.

Now, referring to FIG. 32, it will be explained that the Bean is a component that is provided with all pieces of information necessary for screen display. FIG. 32 is a view depicting the relationship between the screen information and Bean. In FIG. 32, reference numeral 3201 designates a screen image and an explanation is given to an example of "Order confirm" screen. Reference numeral 3202 designates the class of Bean. The name displayed in a partition 3203 above the class 3202 is a class name, showing that the "ConfirmBean" corresponding to the "Order confirm" is the class name of the Bean. A lower partition 3204 indicates the attribute of the class. The "ConfirmBean" is provided as attributes with all pieces of information necessary to display the "Order confirm" screen, those attributes being retrieved by JSP and displayed as an HTML page. The information which is necessary for screen display and entered to the form of the HTML page is described in the form data specification 2106 of the design document stored in the design document 2004.

Figure 33:
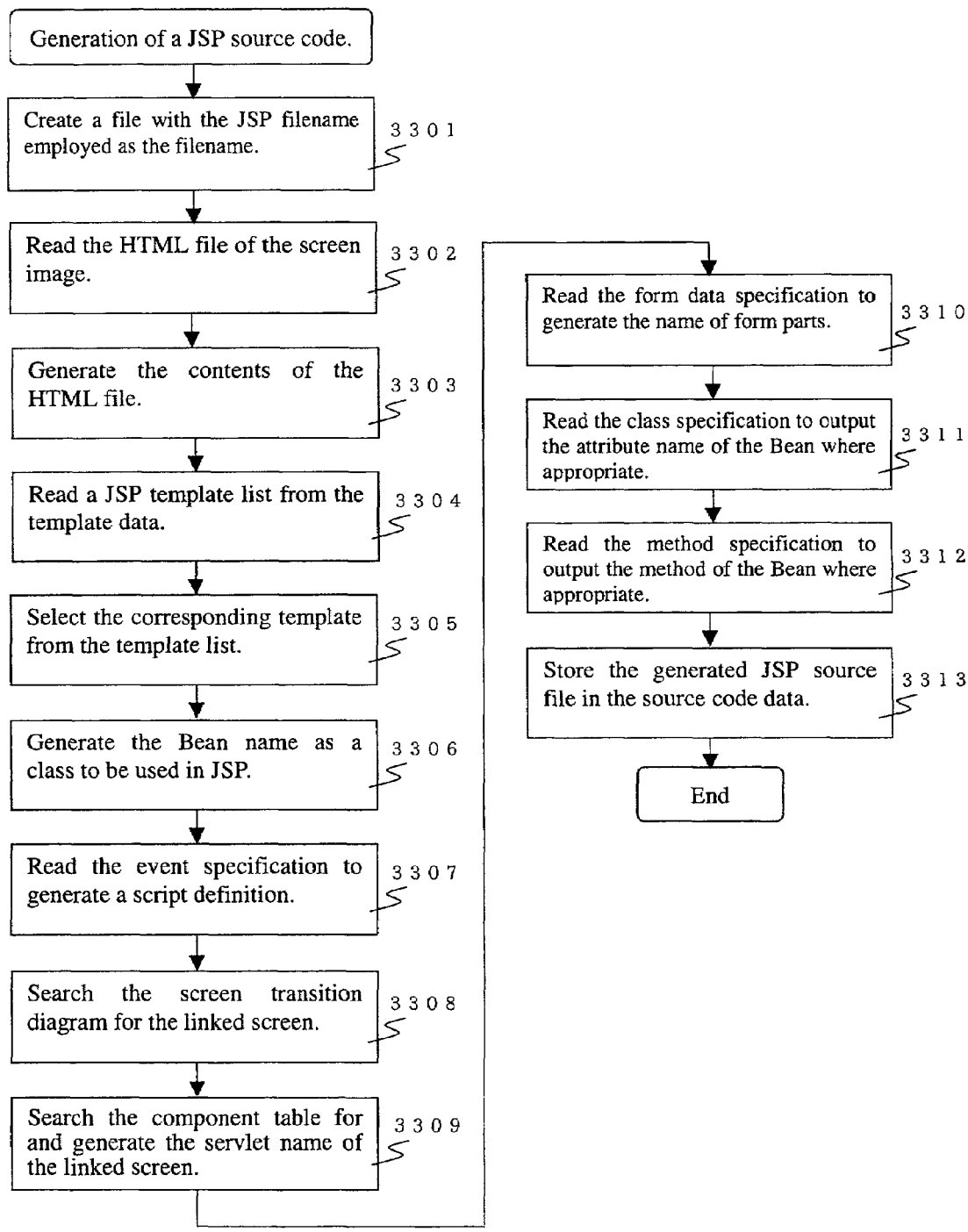
FIG. 33 is a flowchart depicting a flow for automatically generating a JSP source code.
Figure 34:
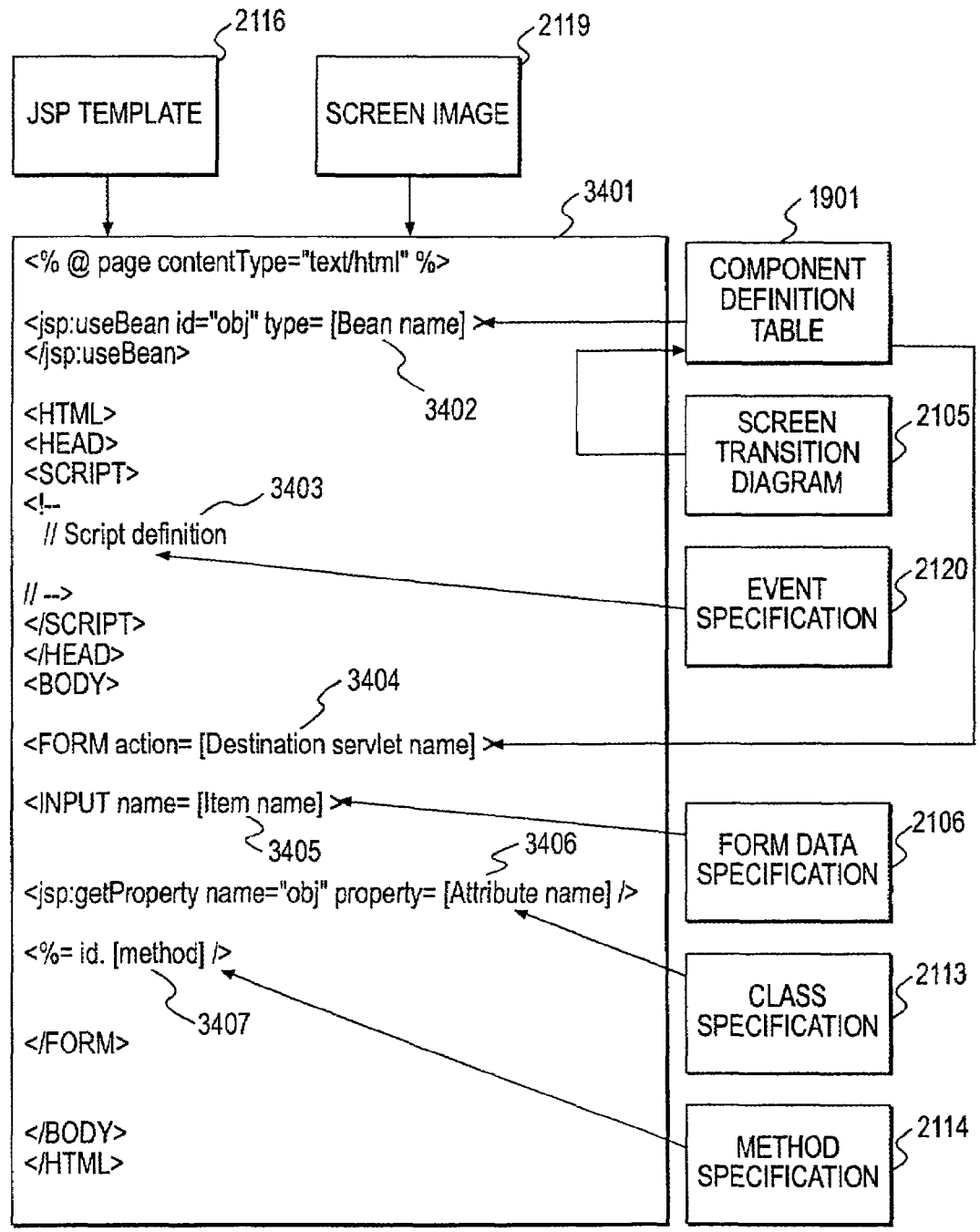
FIG. 34 is a view depicting an example of generating a JSP source code.

Now, referring to FIGS. 33 and 34, a process flow is explained for automatically generating a JSP source code for the designated screen name in the code generating unit 2009. It is assumed that the name of each component defined in the component definition table 1901 is given in advance. An explanation is given here assuming that the screen name 1802 designated is "Order confirm", and the name of the Bean and JSP components is "ConfirmBean" and "confirm.jsp", respectively. Upon generation of a JSP source code, employed are the JSP template, the component definition table 1901, the screen image 2119 from the design document stored in the design document 2004, the screen transition diagram 2105, the event specification 2120, the form data specification 2106, the class specification 2113, and the method specification 2114. Referring to FIG. 34, reference numeral 3401 designates a JSP source code to be generated.

First, created is a file "Confirm.jsp" with the filename of the given JSP name 1806 employed as the filename (step 3301). The HTML file of the screen image 2119 of the "Order confirm" screen is read from the design document (step 3302), and then the contents of the HTML file that has been read are generated (step 3303). Then, a JSP template list is read from the template data 2006 (step 3304). The template data 2006 stores the basic framework of a JSP as well as JSP templates for various use. Then, the template 2116 for use with the JSP to be created is selected from the template list that has been read (step 3305). The selected template 2116 is used as a model for creating a source code 3401 by processing the contents of the HTML file generated in step 3303.

Then, the Bean name 1805 "ConfirmBean" given is generated as a class 3402 to be used in JSP (step 3306). Tag <jsp:useBean> 3402 is a syntax for using the Bean in JSP. The event specification 2120 is read to generate a script definition 3403 for check items employed by a client (step 3307). Then, the original screen is searched in the screen transition diagram 2105 (step 3308). Then, the component definition table 1901 is searched for the servlet name 1804 corresponding to the original screen to output to a form tag action attribute 3404 (step 3309). Then, the form data specification 2106 is read to generate the text entered into the form or names 3405 of parts such as buttons (step 3310). Then, the class specification 2113 is read to output the attribute name of the Bean, using the syntax of the JSP, to the parameter of the parts or the text in the form where appropriate (step 3311). Like in step 3311, the method specification 2114 is read to output it using the method of the Bean where appropriate (step 3312). A tag <jsp:getProperty> 3406 and a tag <%=%> 3407 are a JSP syntax like the tag <jsp:useBean> 3402. Finally, the file of the generated source code 3401 is stored in the source code data 2007, and then control exits from the processing for automatically generating the JSP source code (step 3313).

Now, referring to FIG. 35, an explanation is given to an example of a method for editing the source code of each component of the servlet, JSP, and Bean, in the code editing unit 2010. In FIG. 35, reference numeral 2801 designates an operation screen of the development support system according to this embodiment. In the region 2802 to the left of the screen, displayed are the contents of the component definition table 1901 in a hierarchical structure. Here, suppose that the "Order confirm" 2804 is selected and double-clicked. In this case, the editor will be opened on the region to the right of the screen to show the source code of each component for the "Order confirm" 2804. The servlet source code "ConfirmServlet.java" is opened on an editor screen 3504. Likewise, the Bean source code "ConfirmBean.java" is opened on the editor screen 3503, while the JSP source code "confirm.jsp" is opened on the editor screen 3504. Upon opening each source code, the source code of each component to be edited is read from the source code data 2007, using the component definition table 1901. In addition, the "ConfirmServlet" 2805 can be selected alone to open the "ConfirmServlet.java". This makes it possible for the developer to instantaneously select and open the source code related to the screen to be developed, by selecting the screen name, allowing for retrieving or editing the source code.

As described above, the present invention provides the following effects.

(1) Only a design document is described to create the component table of the name of each component. This makes it possible to facilitate development of a system and alleviate the burden on developers or programmers, thereby providing a reduction in development time.

(2) Relationship among the components of the servlet, JSP, and Bean for each screen is made clear and their respective roles are separately organized, thereby making it possible to develop each screen independently.

(3) The source code of each component can be automatically generated and thereby no special knowledge on Java™ is required. This makes it possible to facilitate programming and thereby alleviate the burden on developers or programmers. Source codes are automatically generated in a standardized uniform fashion by the automatic code generating unit. This facilitates maintenance and makes it possible to provide programs, the performance of which will not be degraded but guaranteed.

(4) Addition, extension, or modification of functions for upgrading the system would require only a new definition or addition of each component of the servlet, JSP, and Bean, or easy identification of components to be modified or those within the known range of modification. This makes it possible to implement an extensible system. Furthermore, it can be safely said that what the development support system according to the present invention provides is the framework of a Web application system configured by the servlet, JSP, and Bean.

(5) Upon development of a Web application system, each component can be defined by determining the GUI specification. This makes it possible to provide prototype or executable programs quickly, thereby allowing actual test of the architecture of the system at earlier time.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A Web application development method for developing, on the Inter- and Intranet, a Web application system having server-side programming language technologies including a servlet, means for executing a programming language code on a Web server, and means for constructing applications by combining reproducible component programs, wherein in accordance with a GUI specification provided by a design specification for said Web application system, a source filename of each component of the servlet, the means for executing the programming language code, and the means for constructing applications is defined corresponding to each screen to develop the servlet, the means for executing the programming language code, and the means for constructing applications, and wherein a source code of each component is automatically generated using a relationship between said screen and a source filename of each component of said servlet, the means for executing the programming language code, the means for constructing applications and information of said design specification; and upon generation of the source code of each component of said servlet, the means for executing the programming language code and the means for constructing applications, a template list is displayed for each component to be generated, a template selected from the template list is employed as a model, and a code is written to the model in accordance with said design specification to automatically generate the source code.

2. A method for developing a Web application according to claim 1, wherein the means for constructing applications is provided with all pieces of information necessary for displaying a Hyper Text Markup Language page, and serves to carry out mapping information of an HTML page and information to be retrieved from a database.

3. A method for developing a Web application according to claim 1, wherein in a Web application system to be developed, the servlet serves to receive a request from a Web browser; the Bean serves to perform processing in accordance with the request of the servlet to hold resulting data; and the means for executing the programming language code serves to retrieve the resulting data of the means for constructing applications by combining reproducible component programs to generate a Hyper Text Markup Language page displayed on the Web browser; thus each role of the servlet, the means for executing the programming language code, and the means for constructing applications being separated from each other.

4. A program provided by a method for developing a Web application according to claim 1.

5. A storage medium for storing a program provided by a method for developing a Web application according to claim 1.

6. A Web application development method for developing, on the Inter- and Intranet, a Web application system having server-side programming language technologies including a servlet, means for executing the programming language code, and means for constructing applications by combining reproducible component programs, wherein in accordance with a GUI specification provided by a design specification for said Web application system, a source filename of each component of the servlet, the means for executing the programming language code, and the means for constructing applications is defined in a one-to-one relationship corresponding to each screen to develop the servlet, the means for executing the programming language code, and the means for constructing applications, and wherein a source code of each component is automatically generated using the relationship between said screen and a source filename of each component of said servlet, the means for executing the programming language code, the means for constructing applications and information of said design specification: and upon generation of the source code of each component of said servlet, the means for executing the programming language code and the means for constructing applications, a template list is displayed for each component to be generated, a template selected from the template list is employed as a model, and a code is written to the model in accordance with said design specification to automatically generate the source code.

7. A Web application development method for developing, on the Inter- and Intranet, a Web application system having server-side programming language technologies such as a servlet, means for executing a programming language code on a Web server, and means for constructing applications by combining reproducible component programs, comprising the steps of:

reading a GUI specification provided by a design specification to generate each component name of the servlet, the means for executing a programming language code on a Web server, and the means for constructing applications by combining reproducible component programs corresponding to a screen name for each screen, a source code of each component is automatically generated using a relationship between said screen and a source filename of each component of said servlet, the means for executing the programming language code, the means for constructing applications and information of said design specification; and upon generation of the source code of each component of said servlet, the means for executing the programming language code and the means for constructing applications, a template list is displayed for each component to be generated, a template selected from the template list is employed as a model, and a code is written to the model in accordance with said design specification to automatically generate the source code.

8. A method for developing a Web application according to claim 7, wherein
said template list includes a superclass template, and the step of generating automatically said source code is to inherit said superclass to create said source code.

9. A method for developing a Web application according to claim 7, wherein
said step of generating a name of each component is to generate a name of each component of a the servlet, the means for executing a programming language code on a Web server, and the means for constructing applications by combining reproducible component programs in a one-to-one relationship with a screen name for said each screen.

10. A Web application development system for developing, on the Inter- and Intranet, a Web application system having server-side programming language technologies such as a servlet, means for executing a programming language code on a Web server, and means for constructing applications by combining reproducible component programs,
said system comprising means for developing the servlet, the means for executing the programming language code, and the means for constructing applications by defining a source filename of each component of the servlet, the means for executing the programming language code, and the means for constructing applications corresponding to each screen, in accordance with a GUI specification provided by a design specification for said Web application system, and
means for automatically generating a source code of each component using a relationship between said screen and a source filename of each component of said servlet, the means for executing the programming language code, the means for constructing applications and information of said design specification; and upon generation of the source code of each component of said servelet, the means for executing the programming language code and the means for constructing applications, a template list is displayed for each component to be generated, a template selected from the template list is employed as a model, and a code is written to the model in accordance with said design specification to automatically generate the source code.

11. A system for developing a Web application according to claim 10, further comprising
means for automatically generating a source code of each component, using the relationship between said screen and a source filename of each component of said servlet, the means for executing the programming language code, and the means for constructing applications, and information of said design specification.

12. A system for developing a Web application according to claim 11, further comprising:
upon generation of the source code of each component of said servlet, the means for executing the programming language code, and the means for constructing applications, means for displaying a template list for each component to be generated, for employing a template selected from the template list as a model, and for writing a code to the model in accordance with said design specification to automatically generate a source code.

13. A system for developing a Web application according to claim 10, wherein
the means for constructing applications by combining reproducible component programs is provided with all pieces of information necessary for displaying a Hyper Text Markup Language, and serves to carry out mapping information of a Hyper Text Markup Language page and information to be retrieved from a database.

14. A system for developing a Web application according to claim 10, wherein
in a Web application system to be developed, the servlet serves to receive a request from a Web browser; the means for constructing applications serves to perform processing in accordance with the request of the servlet to hold resulting data; and the means for executing the programming language code serves to retrieve the resulting data of the means for constructing applications to generate a Hyper Text Markup Language page displayed on the Web browser; thus each role of the servlet, the means for executing the programming language code, and the means for constructing applications being separated from each other.

15. A Web application development system for developing, on the Inter- and Intranet, a Web application system having server-side programming language technologies such as a servlet, means for executing a programming language code on a Web server, and means for constructing applications by combining reproducible component programs,
said system comprising means for developing the servlet, the means for executing the programming language code, and the means for constructing applications by defining a source filename of each component of the servlet, the means for executing the programming language code, and the means for constructing applications in a one-to-one relationship corresponding to each screen, in accordance with a GUI specification provided by a design specification for said Web application system, and wherein
means for automatically generating a source code of each component using the relationship between said screen and a source filename of each component of said servlet, the means for executing the programming language code, the means for constructing applications and information of said design specification; and upon generation of the source code of each component of said servelet, the means for executing the programming language code and the means for constructing applications, a template list is displayed for each component to be generated, a template selected from the template list is employed as a model, and a code is written to the model in accordance with said design specification to automatically generate the source code.

16. A Web application development system for developing, on the Inter- and Intranet, a Web application system having server-side programming language technologies such as a servlet, means for executing a programming language code on a Web server, and means for constructing applications by combining reproducible component programs, comprising means for reading a GUI specification provided by a design specification to generate each component name of a servlet, the means for executing the programming language code, and the means for constructing applications corresponding to a screen name for each screen, means for automatically generating a source code of each complement using a relationship between said screen and a source filename of each component of said servlet, the means for executing the programming language code, the means for constructing applications and information of said design specification; and upon generation of the source code of each component of said servelet, the means for executing the programming language code and the means for constructing applications, a template list is displayed for each component to be generated, a template selected from the template list is employed as a model, and a code is written to the model in accordance with said design specification to automatically generate the source code.

17. A system for developing a Web application according to claim 16, wherein
   said template list includes a superclass template, and the means for generating automatically said source code are to inherit said superclass to create said source code.

18. A system for developing a Web application according to claim 16, wherein
   said means for generating a name of each component is to generate a name of each component of a servlet, the means for executing the programming language code, and the means for constructing applications in a one-to-one relationship with a screen name for said each screen.

* * * * *